US012786237B2

(12) United States Patent
Batson et al.

(10) Patent No.: US 12,786,237 B2
(45) Date of Patent: Nov. 3, 2026

(54) SECURITY EVENTS GRAPH FOR ALERT PRIORITIZATION

(71) Applicant: Netskope, Inc., Santa Clara, CA (US)

(72) Inventors: Joshua D. Batson, Sunnyvale, CA (US); Raymond J. Canzanese, Jr., Philadelphia, PA (US); Nigel Brown, Ottery St. Mary (GB)

(73) Assignee: Netskope, Inc., Santa Clara, CA (US)

(*) Notice: Subject to any disclaimer, the term of this patent is extended or adjusted under 35 U.S.C. 154(b) by 60 days.

(21) Appl. No.: 18/395,379

(22) Filed: Dec. 22, 2023

(65) Prior Publication Data

US 2024/0137390 A1 Apr. 25, 2024

Related U.S. Application Data

(63) Continuation-in-part of application No. 18/069,146, filed on Dec. 20, 2022, now Pat. No. 11,991,213, and a continuation-in-part of application No. 17/516,689, filed on Nov. 1, 2021, now Pat. No. 11,856,016, which is a continuation of application No. 16/361,039, filed on Mar. 21, 2019, now Pat. No. 11,165,803, said application No. 18/069,146 is a continuation of application No. 16/361,023, filed on Mar. 21, 2019, now Pat. No. 11,539,749.

(60) Provisional application No. 62/683,789, filed on Jun. 12, 2018, provisional application No. 62/683,795, filed on Jun. 12, 2018.

(51) Int. Cl.
*H04L 29/06* (2006.01)
*H04L 9/40* (2022.01)

(52) U.S. Cl.
CPC .................................... *H04L 63/20* (2013.01)

(58) Field of Classification Search
CPC ................ H04L 63/20; H04L 63/1416; H04L 45/122; H04L 63/1425; H04L 63/1441; H04L 63/1408; G06F 16/906; G06F 16/9024; G06F 21/53; G06F 21/56
See application file for complete search history.

(56) References Cited

U.S. PATENT DOCUMENTS

| | | | |
|---|---|---|---|
| 5,440,723 | A | 8/1995 | Arnold et al. |
| 6,513,122 | B1 | 1/2003 | Magdych et al. |
| 6,622,248 | B1 | 9/2003 | Hirai |
| 7,080,408 | B1 | 7/2006 | Pak et al. |

(Continued)

FOREIGN PATENT DOCUMENTS

EP 1063833 A2 12/2000

OTHER PUBLICATIONS

Martin, Victoria "Cooperative Security Fabric," The Fortinet Cookbook, Jun. 8, 2016, 6 pgs., archived Jul. 28, 2016 at https://web.archive.org/web/20160728170025/http://cookbook.fortinet.com/cooperative-security-fabric-54".

(Continued)

*Primary Examiner* — Benjamin E Lanier

(57) ABSTRACT

The technology includes a system to reduce clutter when displaying a security analysis graph of nodes and edges. Simple chains of nodes do not have branches and are equivalent when they have the same length, connection types and endpoints. First, second and potentially more simple chains can be aggregated for display. A third and potentially more simple chains can be excluded from aggregation based on an accumulated risk analysis score. The excluded simple chain can readily be called to an analyst's attention.

17 Claims, 27 Drawing Sheets

1300

(56) References Cited

U.S. PATENT DOCUMENTS 7,298,864 B2 11/2007 Jones
7,376,719 B1 5/2008 Shafer et al.
7,624,448 B2 11/2009 Coffman
7,735,116 B1 6/2010 Gauvin
7,966,654 B2 6/2011 Crawford
8,000,329 B2 8/2011 Fendick et al.
8,296,178 B2 10/2012 Hudis et al.
8,719,943 B2 5/2014 Noel et al.
8,793,151 B2 7/2014 DelZoppo et al.
8,813,234 B1 8/2014 Bowers et al.
8,839,417 B1 9/2014 Jordan
9,197,601 B2 11/2015 Pasdar
9,225,734 B1 12/2015 Hastings
9,231,968 B2 1/2016 Fang et al.
9,280,678 B2 3/2016 Redberg
9,578,042 B2 2/2017 Hu et al.
9,609,011 B2 3/2017 Muddu et al.
9,811,662 B2 11/2017 Sharpe et al.
10,084,825 B1 9/2018 Xu
10,237,282 B2 3/2019 Nelson et al.
10,334,442 B2 6/2019 Vaughn et al.
10,341,373 B2 7/2019 Bhatkar et al.
10,382,468 B2 8/2019 Dods
10,409,995 B1 9/2019 Wasiq et al.
10,454,753 B2 10/2019 Sasturkar et al.
10,484,334 B1 11/2019 Lee et al.
10,742,670 B1 * 8/2020 Kayyoor ................. G06F 21/56
10,826,941 B2 11/2020 Jain et al.
10,831,827 B2 11/2020 Gifford et al.
11,032,301 B2 6/2021 Mandrychenko et al.
11,036,856 B2 6/2021 Graun et al.
11,201,890 B1 12/2021 Coull et al.
11,281,775 B2 3/2022 Burdett et al.
2002/0099666 A1 7/2002 Dryer et al.
2003/0055994 A1 3/2003 Herrmann et al.
2003/0063321 A1 4/2003 Inoue et al.
2003/0172292 A1 9/2003 Judge
2003/0204632 A1 10/2003 Willebeek-Lemair et al.
2004/0015719 A1 1/2004 Lee et al.
2005/0010593 A1 1/2005 Fellenstein et al.
2005/0271246 A1 12/2005 Sharma et al.
2006/0156401 A1 7/2006 Newstadt et al.
2007/0204018 A1 8/2007 Chandra et al.
2007/0209074 A1 9/2007 Coffman
2007/0237147 A1 10/2007 Quinn et al.
2008/0069480 A1 3/2008 Aarabi et al.
2008/0134332 A1 6/2008 Keohane et al.
2009/0144818 A1 6/2009 Kumar et al.
2009/0249470 A1 10/2009 Litvin et al.
2009/0300351 A1 12/2009 Lei et al.
2010/0017436 A1 1/2010 Wolge
2011/0035802 A1 2/2011 Arajujo, Jr. et al.
2011/0119481 A1 5/2011 Auradkar et al.
2011/0145594 A1 6/2011 Jho et al.
2012/0227108 A1 9/2012 Noel et al.
2012/0278896 A1 11/2012 Fang et al.
2013/0159694 A1 6/2013 Chiueh et al.
2013/0298190 A1 11/2013 Sikka et al.
2013/0347085 A1 12/2013 Hawthorn et al.
2014/0013112 A1 1/2014 Cidon et al.
2014/0068030 A1 3/2014 Chambers et al.
2014/0068705 A1 3/2014 Chambers et al.
2014/0259093 A1 9/2014 Narayanaswamy et al.
2014/0282843 A1 9/2014 Buruganahalli et al.
2014/0317736 A1 10/2014 Cao et al.
2014/0359282 A1 12/2014 Shikfa et al.
2014/0366079 A1 12/2014 Pasdar
2015/0100357 A1 4/2015 Seese et al.
2015/0188941 A1 7/2015 Boshmaf et al.
2016/0205122 A1 7/2016 Bassett
2016/0210556 A1 7/2016 Ben Simhon et al.
2016/0261608 A1 9/2016 Hu et al.
2016/0323318 A1 11/2016 Terrill et al.
2016/0350145 A1 12/2016 Botzer et al.
2017/0063902 A1 3/2017 Muddu et al.
2017/0063910 A1 3/2017 Muddu et al.
2017/0064005 A1 3/2017 Lee
2017/0093917 A1 3/2017 Chandra et al.
2017/0199927 A1 7/2017 Moore et al.
2017/0222873 A1 8/2017 Lee et al.
2017/0250951 A1 8/2017 Wang et al.
2017/0286845 A1 10/2017 Gifford et al.
2018/0308026 A1 10/2018 Sinha et al.
2018/0351783 A1 12/2018 Patrich et al.
2018/0367548 A1 12/2018 Stokes, III et al.
2018/0375883 A1 12/2018 Bhatkar et al.
2019/0238564 A1 8/2019 Rao et al.
2019/0251251 A1 8/2019 Carson
2019/0286757 A1 * 9/2019 Muntés-Mulero .... G06F 11/079
2019/0342307 A1 * 11/2019 Gamble ................ G06F 16/907
2020/0050686 A1 2/2020 Kamalapuram et al.
2020/0167785 A1 * 5/2020 Kursun ................. H04L 43/045
2020/0358804 A1 11/2020 Crabtree et al.

OTHER PUBLICATIONS

Huckaby, Jeff "Ending Clear Text Protocols," Rackaid.com, Dec. 9, 2008, 3 pgs.
Newton, Harry "fabric," Newton's Telecom Dictionary, 30th Updated, Expanded, Anniversary Edition, 2016, 3 pgs.
Fortinet, "Fortinet Security Fabric Earns 100% Detection Scores Across Several Attack Vectors in NSS Labs' Latest Breach Detection Group Test [press release]", Aug. 2, 2016, 4 pgs, available at https://www.fortinet.com/de/corporate/about-us/newsroom/press-releases/2016/security-fabric-earns-100-percent-breach-detection-scores-nss-labs.
Fortinet, "Fortinet Security Fabric Named 2016 CRN Network Security Product of the Year [press release]", Dec. 5, 2016, 4 pgs, available at https://www.fortinet.com/corporate/about-us/newsroom/press-releases/2016/fortinet-security-fabric-named-2016-crn-network-security-product.
McCullagh, Declan, "How safe is instant messaging? A security and privacy survey," CNET, Jun. 9, 2008, 14 pgs.
Beck et al., "IBM and Cisco: Together for a World Class Data Center," IBM Redbooks, Jul. 2013, 654 pgs.
Martin, Victoria "Installing internal FortiGates and enabling a security fabric," The Fortinet Cookbook, Jun. 8, 2016, 11 pgs, archived Aug. 28, 2016 at https://web.archive.org/web/20160828235831/http://cookbook.fortinet.com/ installing-isfw-fortigate-enabling-csf-54/".
Zetter, Kim, "Revealed: The Internet's Biggest Security Hole," Wired, Aug. 26, 2008, 13 pgs.
Adya et al., "Farsite: Federated, available, and reliable storage for an incompletely trusted environment," SIGOPS Oper. Syst. Rev. 36, SI, Dec. 2002, pp. 1-14.
Agrawal et al., "Order preserving encryption for numeric data," In Proceedings of the 2004 ACM SIGMOD international conference on Management of data, Jun. 2004, pp. 563-574.
Balakrishnan et al., "A layered naming architecture for the Internet," ACM SIGCOMM Computer Communication Review, 34(4), 2004, pp. 343-352.
Downing et al., Naming Dictionary of Computer and Internet Terms, (11th Ed.) Barron's, 2013, 6 pgs.
Downing et al., Dictionary of Computer and Internet Terms, (10th Ed.) Barron's, 2009, 4 pgs.
Zoho Mail, "Email Protocols: What they are & their different types," 2006, 7 pgs. available at https://www.zoho.com/mail/glossary/email-protocols.html#:~: text=mode of communication.-, What are the different email protocols%3F, and also has defined functions.
NIIT, Special Edition Using Storage Area Networks, Que, 2002, 6 pgs.
Chapple, Mike, "Firewall redundancy: Deployment scenarios and benefits," TechTarget, 2005, 5 pgs. available at https://www.techtarget.com/searchsecurity/tip/Firewall-redundancy-Deployment-scenarios-and-benefits?Offer=abt_pubpro_AI-Insider.
Fortinet, FortiGate—3600 User Manual (vol. 1, Version 2.50 MR2) Sep. 5, 2003, 329 pgs.
Fortinet, FortiGate SOHO and SMB Configuration Example, (Version 3.0 MR5), Aug. 24, 2007, 54 pgs.

(56) References Cited

OTHER PUBLICATIONS

Fortinet, FortiSandbox—Administration Guide, (Version 2.3.2), Nov. 9, 2016, 191 pgs.
Fortinet, FortiSandbox Administration Guide, (Version 4.2.4) Jun. 12, 2023, 245 pgs. available at https://fortinetweb.s3.amazonaws.com/docs.fortinet.com/v2/attachments/fba32b46-b7c0-11ed-8e6d-fa163e15d75b/FortiSandbox-4.2.4-Administration_Guide.pdf.
Fortinet, FortiOS—Administration Guide, (Versions 6.4.0), Jun. 3, 2021, 1638 pgs.
Heady et al., "The Architecture of a Network Level Intrusion Detection System," University of New Mexico, Aug. 15, 1990, 21 pgs.
Kephart et al., "Fighting Computer Viruses," Scientific American (vol. 277, No. 5) Nov. 1997, pp. 88-93.
Wang, L., Chapter 5: Cooperative Security in D2D Communications, "Physical Layer Security in Wireless Cooperative Networks," 41 pgs. first online on Sep. 1, 2017 at https://link.springer.com/chapter/10.1007/978-3-319-61863-0_5.
Lee et al., "A Data Mining Framework for Building Intrusion Detection Models," Columbia University, n.d. 13 pgs.
Merriam-Webster Dictionary, 2004, 5 pgs.
Microsoft Computer Dictionary, (5th Ed.), Microsoft Press, 2002, 8 pgs.
Microsoft Computer Dictionary, (4th Ed.), Microsoft Press, 1999, 5 pgs.
Mika et al., "Metadata Statistics for a Large Web Corpus," LDOW2012, Apr. 16, 2012, 6 pgs.
Oxford Dictionary of Computing (6th Ed.), 2008, 5 pgs.
Paxson, Vern, "Bro: a System for Detecting Network Intruders in Real-Time," Proceedings of the 7th USENIX Security Symposium, Jan. 1998, 22 pgs.
Fortinet Inc.,U.S. Appl. No. 62/503,252, "Building a Cooperative Security Fabric of Hierarchically Interconnected Network Security Devices." n.d., 87 pgs.
Song et al., "Practical techniques for searches on encrypted data," In Proceeding 2000 IEEE symposium on security and privacy. S&P 2000, May 2000, pp. 44-55.
Dean, Tamara, Guide to Telecommunications Technology, Course Technology, 2003, 5 pgs.
U.S. Appl. No. 60/520,577, "Device, System, and Method for Defending a Computer Network," Nov. 17, 2003, 21 pgs.
U.S. Appl. No. 60/552,457, "Fortinet Security Update Technology," Mar. 2004, 6 pgs.
Tittel, Ed, Unified Threat Management for Dummies, John Wiley & Sons, Inc., 2012, 76 pgs.
Fortinet, FortiOS Handbook: UTM Guide (Version 2), Oct. 15, 2010, 188 pgs.
Full Definition of Security, Wayback Machine Archive of Merriam-Webster on Nov. 17, 2016, 1 pg.
Definition of Cooperative, Wayback Machine Archive of Merriam-Webster on Nov. 26, 2016, 1 pg.
Pfaffenberger, Bryan, Webster's New World Computer Dictionary, (10th Ed.), 2003, 5 pgs.
U.S. Appl. No. 16/361,039—First Action Interview Pilot Pre-Interview Communication dated Apr. 7, 2021, 7 pgs.
Netskope, "Data Loss Prevention and Monitoring in the Cloud", Nov. 2014, 18 pages.
"Repave the Cloud-Data Breach Collision Course," netSkope, Inc., 2014, 6 pgs.
Kent et al., Guide to Computer Security Log Management, National Institute of Standards and Technology (NIST), Special Publication No. SP 800-92, Sep. 2006, 64 pages.
A. C. Gilbert et al. Compressing Network Graphs. InLinkKDD, 2004, 10 pgs.
"The Netskope Advantage: Three "Must-Have" Requirements for Cloud Access Security Brokers", Jul. 2015, WP-12-2, 4 pages.
"The Netskope Active Platform Enabling Safe Migration to the Cloud", Apr. 2015, DS-1-8, Netskope, Inc., 6 pages.
"Netskope the 15 Critical CASB use Cases", Netskope, Inc., EB-141-1, 19 pages.
"Cloud Data Loss Prevention Reference Architecture", Netskope, Sep. 2015, WP-88-1, 2 pages.
Liu et al. , "Isolation forest," Data Min. Know!. Discov., 2008, 10 pages.
J. Stokes et al., "On the number of star samples to find a vertex or edge with given degree in a graph," 2017 51st Annual Conference on Information Sciences and Systems (CISS), 2017, pp. 1-6.
Henderson et al., IIt's Who You Know—Graph Mining Using Recursive Structural Features,, KDD '11, Proceedings of the 17th ACM SIGKDD international conference on Knowledge discovery and data mining Aug. 2011 pp. 663-671.
Akoglu et al., "Graph based anomaly detection and description: a survey," Data Min. Know!. Discov., vol. 29, No. 3, pp. 626-688, 2014. (arXiv:1404.4679v2 [cs.SI] Apr. 28, 2014).
Akoglu, et al., "Oddball—Spotting Anomalies in Weighted Graphs," Lecture Notes in Computer Science, 2010, pp. 410-421.
Page et al., , "The PageRank citation ranking—Bringing order to the web," Stanford Infolab, 1999.
U.S. Appl. No. 16/361,039, filed Mar. 21, 2019, U.S. Pat. No. 11,165,803, Nov. 2, 2021, Issued.
U.S. Appl. No. 17/516,689, filed Nov. 1, 2021, U.S. Pat. No. 11,856,016, Dec. 26, 2023, Issued.

* cited by examiner

| Node | Aggregated Score | From IP 1.1.1.1 | From Database 2 |
|---|---|---|---|
| IP 1.1.1.1 | 100.572 | N/A | 0.572 |
| User 1 | 36.143 | 34.482 | 1.661 |
| Host A | 5.456 | 0.105 | 5.351 |
| IP 92.168.1.1 | 15.553 | 0.036 | 15.517 |
| Database 1 | 4.826 | 0.011 | 4.815 |
| Database 2 | 100.011 | 0.011 | N/A |
| User 100 | 1.693 | 0.032 | 1.661 |
| IP 1.1.1.100 | 0.583 | 0.011 | 0.572 |

SECURITY EVENTS GRAPH FOR ALERT PRIORITIZATION

PRIORITY DATA

This application is a continuation-in-part of U.S. Ser. No. 18/069,146 titled "Security Events Graph For Alert Prioritization," filed on 20 Dec. 2022 which is a continuation of U.S. Ser. No. 16/361,023 titled "Systems and Methods for Alert Prioritization Using Security Events Graph," filed 21 Mar. 2019, now U.S. Pat. No. 11,539,749, issued 27 Dec. 2022 which claims the benefit of U.S. Provisional Patent Application No. 62/683,795 titled "Alert Prioritization Using Graph Algorithms," filed on 12 Jun. 2018. These priority applications are incorporated by reference as if fully set forth herein, just as Ser. Nos. 18/069,146 and 16/361,023 previously were.

This application is also a continuation-in-part of U.S. Ser. No. 17/516,689, titled "Systems And Methods For Controlling Declutter of a Security Events Graph," filed on 1 Nov. 2021, now U.S. Pat. No. 11,856,016, issued 26 Dec. 2023 which is a continuation of U.S. patent application Ser. No. 16/361,039 titled "Systems and Methods To Show Detailed Structure in a Security Events Graph," filed on 21 Mar. 2019, now U.S. Pat. No. 11,165,803, issued 2 Nov. 2021 which claims the benefit of U.S. Provisional Patent Application No. 62/683,789, titled "System To Show Detailed Structure In A Moderately Sized Graph," filed on 12 Jun. 2018. Priority application Ser. No. 16/361,039 and 62/683,789 are incorporated by reference as if fully set forth herein, just as they were incorporated in U.S. Ser. Nos. 18/069,146 and 16/361,023. Parts of these priority applications are now bodily incorporated in this application.

FIELD OF THE TECHNOLOGY DISCLOSED

The technology disclosed relates to graph presentation for prioritization of security incidents and incident analysis.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Security analysts use log data generated by security and operations systems to identify and protect enterprise networks against cybersecurity threats. Gigabytes of log security and operations log data can be generated in a short time. These logs contain security events with varying levels of threat. Firstly, it is difficult for an analyst to go through these logs and identify the alerts that need immediate attention. Secondly, it is difficult to identify different computer network entities related to a particular alert. Graphs can be used to visualize computer network entities which are connected to other entities through edges. However for a typical enterprise network, graphs can become very large with hundreds of thousands of entities connected through tens of millions edges. Security analysts are overwhelmed by such graphs of security events and they can miss most important alerts and entities related to those alerts. Some of these alerts are false positives. In most cases, a well-planned cyberattack impacts more than one entity in the enterprise network. It is difficult for security analysts to review the graph and identify groups of entities impacted by one or more alerts in the logs.

Therefore, an opportunity arises to automatically identify groups of entities in an enterprise network that are impacted by one or more alerts in the logs of data generated by security systems in a computer network and to present analysts most important nodes in graphs representing computer network entities.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Figure 1:
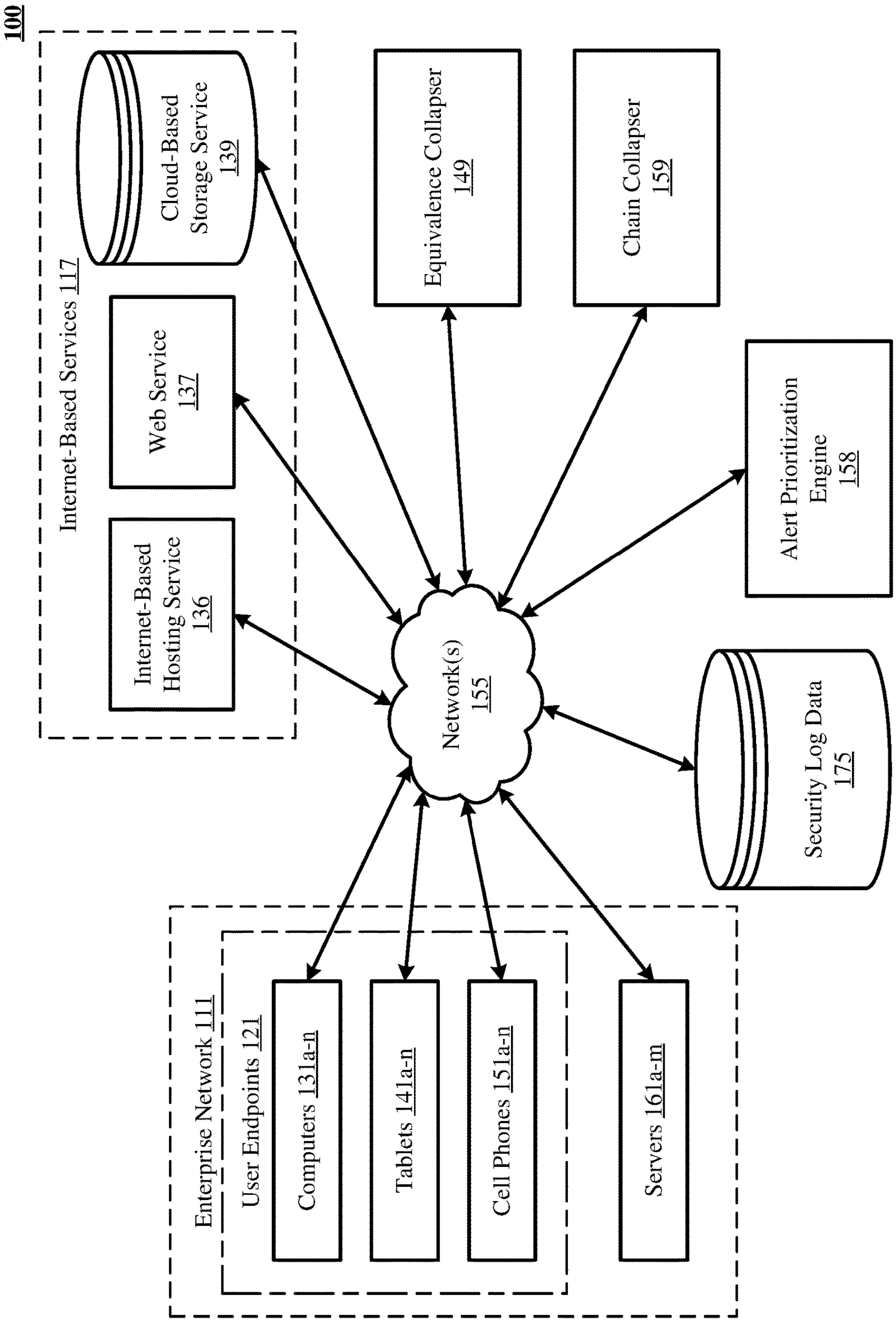
FIG. 1 illustrates an architectural level schematic of a system in which an alert prioritization engine is used to automatically group security alerts and present prioritized alerts to a security analyst. It also shows an equivalence collapser and a chain collapser are used to prevent aggregation of nodes of indicated interest in a security events graph.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

INTRODUCTION

Protecting enterprise networks against cybersecurity attacks is a priority of every organization. Gigabytes of security log data can be generated by packet filters, firewalls, anti-malware software, intrusion detection and prevention systems, vulnerability management software, authentication servers, network quarantine servers, application servers, database servers and other devices, even in a single 24 hour period. The logs generated by these systems contain alerts for different entities of the computer network. Some security systems assign scores to such alerts. However, not all alerts are equal and some alerts are false positives. Security analysts determine from voluminous logs alerts that present a threat that require immediate attention. Groups of security alerts, spanning different entities in the enterprise network, can be more telling than individual alerts, but grouping is challenging and time consuming.

More generally, log records are generated by both security systems and operation systems. The operational systems, such as servers, caches and load balancers, report audit logs that detail all activity of the systems. Log information is presented to security analysts for a variety of purposes, including investigating security incidents and identifying potential threats.

Graphs of enterprise networks can help security analysts visualize entities in the computer network and their alert status. The technology disclosed builds on a graph of enterprise network, with nodes representing entities in the network. The technology disclosed assigns alert scores generated by security systems to nodes or edges connecting the nodes. We refer to these assigned alert scores as "native" scores, to distinguish them from scores resulting from propagation through the graph. Different types of edges represent different types of relationships between the nodes. Consistent with edge types, we assign weights to edges representing the strength of the relationship between the connected nodes. Simply rendering an annotated graph would create a visualization of logs, but would be too cluttered to facilitate prioritization of threats to the enterprise network, so we do more.

The technology disclosed reduces the burden on security analysts by automatically finding groups of security alerts and presenting prioritized groups to the security analyst. This includes applying rules to propagate the native scores through the graph, leading to node clusters based on an aggregation of native and propagated alert scores.

Graph traversal determines the propagated impact of a native alert score on connected, neighboring nodes. The technique can involve an extra step if alert scores are assigned to edges, a step of imputing the assigned alert scores to one node or both connected nodes, in cases of a directed edge or of an undirected or bi-directed edge, respectively. Alternatively, scores on edges can be propagated in the same way that we describe propagating scores on nodes. For each starting node with a native alert score, we traverse the graph following edges from the starting node to propagate the starting node's native alert score to neighboring nodes. Native scores of other nodes encountered during the propagation are ignored, are handled when those other nodes become starting nodes. Traversal can be terminated after a pre-determined number of edges/nodes, such as five, or when propagation attenuates the score below a predetermined threshold. Weights on edges attenuate propagation. We normalize the propagated score at each visited node using the number of edges of the same type connected to the visited node, which also attenuates propagation. For instance, a node representing a server may be connected to a hundred client nodes and so receives only a small contribution propagated from each client node. Over multiple propagations from starting nodes, we sum the propagated scores at visited nodes to accumulate aggregate scores. The sum of propagated scores can be further normalized based on a sum of weights of relationship strengths on edges connected to the visited node. Scoring supports clustering for prioritized display.

The technology disclosed clusters connected nodes based on uninterrupted chains of summed propagated scores. Connected nodes are clustered when they have aggregate scores above a selected threshold. Clusters are separated by at least one node that has an aggregated score below the selected threshold, effectively breaking the chain. The threshold can be a predetermined score, a ratio of scores between connected nodes, or a combination of both. For instance, a pair of connected nodes can be separated into different clusters when one node has a score 10× the other node. We calculate cluster scores by summing aggregate scores of nodes in the cluster and, in some instances, normalizing the sum. We rank and prioritize clusters for display and potential analysis using the cluster scores.

Graphs are one way to help analysts visualize the computer network entities, both for incident response and threat hunting. Logs for an enterprise network can identify hundreds of thousands of nodes connected through tens of millions of edges, referred to as a graph. Graphs become more complex over larger windows, such as a week or month of security events. Presenting a detailed graph with the month of security events is overwhelming or meaningless to a security analyst. It is overwhelming if the analyst tries to make sense of individual edges. It is meaningless when the graphic visualization looks like a ball of string.

The technology disclosed includes two collapsing methods, equivalence collapsing and chain collapsing, which can be used to simplify graph structures without hiding nodes of high interest to analysts. In equivalence collapsing, a group of nodes can be collapsed into a single representative node, a so-called equivalence node, when nodes in the group are equivalent, in the sense that the nodes have matching degrees, are connected to the same endpoint nodes, and are connected by matching edge types. To avoid hiding nodes of high interest, equivalent nodes are scored before the collapse. Nodes that score above a predetermined threshold are excluded from collapsing.

In chain collapsing, a chain of nodes can be collapsed into a single representative node, a so-called chain-collapsed node, when nodes in the chain have a degree of one or two. Chain collapsing is only applied to simple chains, not chains with branches. Slightly different cases are presented by a chain of nodes that forms a whisker ending in a leaf node (degree of one at the end) and by a chain of nodes connected at both ends to two other nodes (degree of two for all nodes). Before collapsing, nodes in the chain are scored. Chains that score above a predetermined threshold are excluded from collapsing. After collapsing, the representative chain-collapsed node is given a score that combines scores of the collapsed nodes.

Chain-collapsed nodes can be further equivalence collapsed. When equivalence collapsing follows chain collapsing, an additional factor is considered whether chain-collapsed nodes being judged for equivalence represent chains of matching length.

System Overview

We describe a system to group security alerts generated in a computer network and prioritize grouped security alerts for analysis. The system also simplifies graph structures without hiding nodes of high interest to analysis. The system is described with reference to FIG. 1 showing an architectural level schematic of a system in accordance with an implementation. Because FIG. 1 is an architectural diagram, certain details are intentionally omitted to improve the clarity of the description. The discussion of FIG. 1 is organized as follows. First, the elements of the figure are described, followed by their interconnection. Then, the use of the elements in the system is described in greater detail.

FIG. 1 includes system 100. This paragraph names the labelled parts of system 100. The figure illustrates user endpoints 121, servers 161*a-m*, a network(s) 155, an Internet-based hosting service 136, a web service 137, a cloud-based storage service 139, an alert prioritization engine 158, equivalence collapser 149, a chain collapser 159, and a security log database 175. Internet-based hosting service 136, the web service 137, and the cloud-based storage service 139 are collectively referred to as Internet-based services 117. User endpoints 121 and servers 161*a-m* are part of an enterprise network 111.

Servers 161*a-m* and user endpoints 121 such as computers 131*a-n*, tablets 141*a-n*, and cell phones 151*a-n* access and interact with the Internet-based services 117. In one implementation, this access and interaction is modulated by an inline proxy (not shown in FIG. 1) that is interposed between the user endpoints 121 and the Internet-based services 117. The inline proxy monitors network traffic between user endpoints 121 and the Internet-based services 117 and can include detection of malicious activity to protect enterprise network and data. The inline proxy can be an Internet-based proxy or a proxy appliance located on premise. The log data collected by the inline proxy can be stored in the security log database 175.

In a so-called managed device implementation, user endpoints 121 are configured with routing agents (not shown) which ensure that requests for the Internet-based services 117 originating from the user endpoints 121 and response to the requests are routed through the inline proxy for policy enforcement. Once the user endpoints 121 are configured with the routing agents, they are under the ambit or purview of the inline proxy, regardless of their location (on premise or off premise).

In a so-called unmanaged device implementation, certain user endpoints that are not configured with the routing agents can still be under the purview of the inline proxy when they are operating in an on premise network monitored by the inline proxy. Both managed and unmanaged devices can be configured with security software to detect malicious activity and store logs of security events in the security log database 175.

The enterprise users access Internet-based services 117 to perform a wide variety of operations such as search for information on webpages hosted by the Internet-based hosting service 136, send and receive emails, upload documents to a cloud-based storage service 139 and download documents from the cloud-based storage service 139. The log database accumulates logs of events related to users and the enterprise from multiple sources. Two sources of such log data include security systems and operations systems. Security systems include packet filters, firewalls, anti-malware software, intrusion detection and prevention systems, vulnerability management software, authentication servers, network quarantine servers. Operations systems include servers, workstations, caches and load balancers and networking devices (e.g., routers and switches). These systems can report hundreds, thousands or millions of events in an enterprise network in one day. Some security systems apply scores (such as on a scale of 1 to 100) indicating the risk associated with an individual event. An alert with a score of 100 likely poses a higher threat to the organization's network as compared to an alert with a score of 10. Not all alerts reported in the logs present the same level of threat and some alerts are false positives. Security analysts can review these logs to identify and analyze high priority alerts that present threats to the enterprise network 111 by well-equipped adversaries, but doing so is tedious.

High priority situations are often presented as a group of interrelated security alerts generated for different entities in the computer network. It is challenging and time consuming to identify these groups of alerts using logs of security data. The technology disclosed reduces burden on security analyst by automatically finding groups of security alerts and presenting prioritized groups to the security analyst. This grouping of security alerts and prioritizing of grouped alerts enables security analyst to focus on nodes that are of interest for high risk security events. Consider a first example of a log entry in the security log database 175 reporting a security event indicating a failed authentication from a user endpoint 121. Now consider a second example of a log entry in the security log database 175 which is also an authentication failure but represents a high risk to the organization. In the second example, an attacker has gained access to a user endpoint 121 in the enterprise network 111. The attacker steals confidential information from the compromised user endpoint. Such information can include a list of servers 161*a-m* in the enterprise network. The attacker then attempts to authenticate to the servers. This can result in a spike in the number of failed authentications from the compromised user endpoint. The attacker can also move laterally to other user endpoints in the enterprise network. The second example presents a situation which requires accelerated investigation by a security analyst.

A serious cyberattack on an enterprise network will likely raise interrelated alerts from multiple, disjoint security systems. Alerts from some of the monitored entities present higher risks than alerts from other entities. For example, a malware execution on a user endpoint 121 may not have the same priority level as compared to a malware execution on a system used as a jump box to access other user endpoints in the network. The security analyst can be well advised to analyze the jump box alert before the endpoint alert, as the jump box immediately impacts many entities in the network. When the analyst reviews a log that doesn't highlight the roles of the jump box and endpoint, it is difficult to prioritize the alerts.

Security analyst analyzes these logs to identify threats to the enterprise network 111. Security analyst is overwhelmed when presented hundreds of events to analyze. The technology disclosed can be used in other contexts and can include collection of data from a variety of data sources, beyond the example operations performed by users visiting the Internet-based services 117. Of course, other contexts, in addition to security monitoring, can make use of the technology disclosed, such as network operations and social networks, and, more generally, any network represented by large graph of nodes connected by relationships that can be analyzed to identify collapsible groups of nodes.

Not all security events present the same level of anomalous behavior in the enterprise network. Consider a first example of a log entry in the security log database 175 reporting a failed authentication from a user endpoint, which is common with long passphrases and frequently changed passwords. A second example of a log entry is also an authentication failure but represents a high risk to the organization. In the second example, an attacker gained access to a user endpoint 121 in the enterprise network 111 and obtained a list of servers 161*a-m* in the enterprise network. The attacker attempted to authenticate to the servers. This resulted in a spike in the number of failed authentications originating from the compromised user endpoint. The attacker can also move laterally to other user endpoints in the enterprise network. The second example requires accelerated investigation by a security analyst. The investigation in such situations is sometimes referred to as threat hunting, as it requires the security analyst to proactively and iteratively search through the enterprise network to detect and isolate threats that evade existing security solutions. A real time response from the security analyst can limit the loss to the organization. This is somewhat different than another type of analysis referred to as incident response. Consider for example, a file containing malware is downloaded to a server in the enterprise network. The malware can start several processes on the server. The security analyst will perform incident response analysis to determine the computer network entities that are impacted by the malware. Such security events also need to be prioritized to get security analyst's attention as they can potentially impact a large number of computer network entities.

Graphs are one way to help analysts visualize the computer network entities, both for threat hunting and incident response types of analysis. Logs for an enterprise network can identify hundreds of nodes connected through thousands of edges, referred to as a graph. Graphs become more complex over larger windows, such as a week or month of security events. Presenting a detailed graph with the month of security events is also overwhelming or meaningless to a security analyst.

Graphs of enterprise networks can help security analysts visualize entities in the computer network and their alert status. The technology disclosed builds on a graph of enterprise network, with nodes representing entities in the network. Examples of entities include user endpoints 121, servers 161 *a-m*, file names, usernames, hostnames, IP addresses, mac addresses, email addresses, physical locations, instance identifiers, and autonomous system numbers (ASNs) etc. These example entities typically exist across a longer time scale in an enterprise network, however entities that are short-lived can also be included in the graph if they are important for presenting the correlations, for example, certain emails and transaction identifiers, etc. The technology disclosed builds on a graph of enterprise network with nodes, representing entities, connected with each other by edges representing different connection types. The technology disclosed assigns alert scores generated by security systems to respective nodes or edges connecting the nodes.

The nodes in graphs of enterprise computer network are connected to each other with different types of edges representing different types of relationships between the nodes. Examples of connection types can include an association connection type, a communication connection type, a failure connection type, a location connection type, and an action or operation connection type. The first association connection type indicates that two entities are associated, for example, a host is assigned an IP address statically or via dynamic host configuration protocol (DHCP). The second communication connection type indicates that network communication is observed between two connected entities in the enterprise network. The third failure connection type indicates that an action was attempted but failed, for example a failed authentication attempt. The fourth location connection type indicates geographical relationships between connected entities, for example, an IP address is associated with a geographic region. The fifth action or operation connection type indicates an action or an operation was performed by one of the connected entities. Entities can perform actions, for example, a user can perform an authentication action on a host or a host can execute a process. Additional connection types can be present between entities in the enterprise computer network.

The technology disclosed assigns weights to edges representing the strength of the relationship between the connected nodes. Alerts can also be represented as edges between nodes representing entities in the network. Alert edges can be in addition to other types of edges connecting nodes. The weights reflect the connections types represented by the edges. For example, an association connection between a user and an IP address is stronger than an authentication action connection between a user and a host, because the IP address is associated with the user for longer than the authenticated session of the user on the host. Under these circumstances, the weight assigned to an edge representing an association connection type would be more than the weight assigned to an edge representing an authentication action connection type.

We refer to these assigned alert scores as "native" scores to distinguish them from scores resulting from propagation through the graph. Graph traversal determines impact of native alert scores of nodes on connected, neighboring nodes. If alert scores are assigned to edges, the technology disclosed imputes the score to one or both connected nodes, in case of directed or undirected or bi-directed edge, respectively. In another implementation, the technology disclosed propagates alert scores on edges in the same way as propagation of scores assigned to nodes is described.

The technology disclosed propagates native scores from starting nodes with non-zero native scores. For each starting node, we traverse the graph to propagate starting node's native score to connected, neighboring nodes. Native scores of other nodes encountered during the propagation are ignored, until those score loaded nodes become starting nodes. Traversal can be terminated after a predetermined span from the starting node or when the propagated score falls below a threshold. Weights on edges attenuate (or amplify) the propagated score. Additionally, we normalize the propagated score at each visited node using the number of edges of the same type connected to the visited node to attenuate the propagated score. The propagated scores at visited nodes are accumulated over multiple traversals from different starting nodes, to determine aggregate scores.

The technology disclosed reduces the burden on the security analyst by clustering connected nodes based on uninterrupted chains of aggregate scores. Connected nodes are clustered when they have aggregate scores above a threshold. The threshold can be a predetermined value of aggregate score, a ratio of scores between connected nodes, or a combination of both. Cluster scores are calculated by summing aggregate scores of nodes in the clusters. Clusters with higher cluster scores are prioritized for review by security analyst.

The technology disclosed simplifies graph structures for the security analyst by providing two node collapsing techniques performed by the equivalence collapser 149 and the chain collapser 159. Nodes that are of high interest to security analyst are not hidden in the graph while the nodes that represent other computer network entities can be collapsed into a single representative node. Application of equivalence and chain collapsing to security events graphs simplifies complex graphs so that the security analyst can focus on nodes that are of interest for high risk security events. The two node collapsing techniques apply to two different types of graph structures. Nodes in the graph can represent a variety of network resources in a computer network. Network resources can include data, hardware devices, or services that can be accessed from a remote computer in an enterprise network. Examples of nodes include servers, clients, services, applications, service principals, load balancers, routers, switches, storage buckets, databases, hub, IP addresses, etc. There can be tens to hundreds of different types of nodes in a computer network graph. Some examples of services built on open source frameworks and represented as nodes include Zookeeper™, Kafka™, Elasticsearch™, etc. In other contexts, graphs can represent people, departments, organizations, etc.

Equivalence collapsing applies to a first type of graph structure consisting of multiple nodes connected to the same node with the same type of edge and simplifies such graphs by collapsing the multiple nodes to a single representative node. In the simplified graph, the multiple collapsed nodes are represented by a single representative node, a so-called equivalence node. This scenario occurs frequently in graphs representing computer network entities. For example, consider multiple user endpoints connected to a server, or multiple processes started by a user via a user endpoint. In these examples, the nodes representing multiple user endpoints or multiple processes can be respectively collapsed to an "equivalence node". The nodes collapsed into an equivalence node are equivalent in the sense that the nodes have matching degrees, are connected to the same node (such as the server or the user endpoint in two examples above), and are connected by matching edge types. In the examples above, all endpoints have the same type of connection to the server and all processes have the same type of connection to the user. Entities in a computer network can be connected to each other through different types of connections such as association, action, or communication. For example, an IP address entity is associated with a user endpoint entity or a user endpoint entity performs an action, such as authentication, with a server entity. Equivalence nodes simplify the graph for visualization purposes by collapsing nodes presenting similar information, including connections to other entities.

The technology disclosed avoids hiding nodes of high interest by scoring nodes before applying equivalence collapsing. Nodes that score above a predetermined threshold are excluded from collapsing. In the example of multiple user endpoints connected to a server, if one user endpoint has been compromised by an attacker, its score is increased. This will keep the compromised node visible after the application of equivalence collapsing while the remaining equivalent nodes in the group will be collapsed and represented by an equivalence node. Therefore, the technology disclosed enables avoidance of hiding nodes of high interest.

The second method for simplifying graphs is chain collapsing which applies to a second type of graph structure consisting of multiple nodes connected in a chain having a degree of one or two. Chain collapsing simplifies such graphs by collapsing multiple nodes to a single representative node. In the simplified graph, the multiple collapsed nodes are represented by a single representative node, a so-called chain-collapsed node. These types of graph structures also appear frequently in graphs of computer network entities. For example, a file that is renamed many times will appear as a chain of nodes connected to each other in which each node indicates a new file name. Another example which will form a chain of nodes in a graph of computer network entities is that of a process connected to its long-path filename which is further connected to pathless filename. Equivalence collapsing technique does not simplify the chains of nodes in the graph as the nodes connected in the chain do not fulfill the conditions of equivalence nodes. Chain collapsing is only applied to simple chains which consist of nodes having degrees one or two and not chains with branches.

Chain-collapsing can be applied to two slightly different cases of chains. A first case is that of a chain of nodes that forms a whisker by ending in a leaf node. In this type of chain all nodes have a degree of two except one node at the end of the chain which has a degree of one. A second case is that of a chain of nodes that is connected at both ends to two other nodes. In this type of chain, all nodes have a degree of two. The technology disclosed can also collapse chains that are variation of the second case in which the starting and the ending nodes are the same. This type of chain is in the form of a loop, with all nodes in the chain having a degree of two and the starting/ending node have a degree greater than two.

Scores are assigned to nodes in the chains before collapsing the chains. In one implementation, all nodes in chains are assigned equal score. Scores for chains are calculated by summing the scores of the nodes in respective chains. Chains that have scores above a threshold are not collapsed. This is to avoid collapsing chains of unusual length so that these are visible to the security analyst. The technology disclosed can apply other criteria to score nodes in a chain. For example, if one or more nodes in a chain have an alert associated with them, their scores are increased above the threshold so that this chain of nodes is not collapsed. This causes nodes of high interest to remain visible to the security analyst. After the chains are collapsed, each chain is represented by a single chain-collapsed node.

Chain-collapsed nodes can be further equivalence collapsed, if the chain-collapsed nodes fulfill an additional factor: whether chain-collapsed nodes that are being considered for equivalence collapsing have matching length represented by their respective scores. Applying the two collapsing techniques sequentially considerably reduces the complexity of the graph representing computer network entities.

Completing the description of FIG. 1, the components of the system 100, described above, are all coupled in communication the network(s) 155. The actual communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX. The engines or system components of FIG. 1 are implemented by software running on varying types of computing devices. Example devices are a workstation, a server, a computing cluster, a blade server, and a server farm. Additionally, a variety of authorization and authentication techniques, such as username/password, Open Authorization (OAuth), Kerberos, SecureID, digital certificates and more, can be used to secure the communications.

System Components—Alert Prioritization Engine

Figure 2:
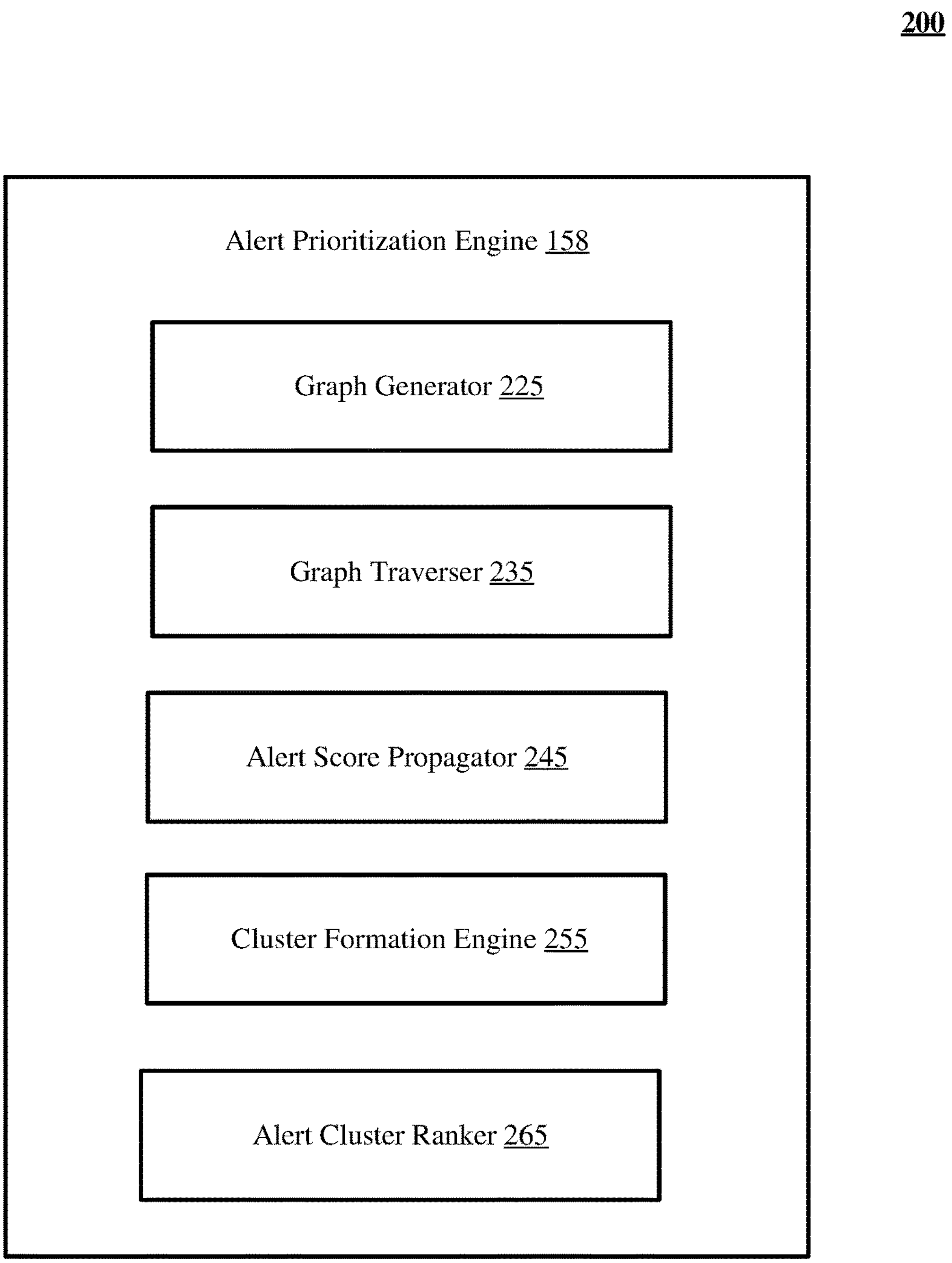
FIG. 2 is a block diagram example of components of the alert prioritization engine of FIG. 1.

FIG. 2 is a high-level block diagram 200 illustrating subsystem components of the alert prioritization engine 158. The subsystems can include a graph generator 225, a graph traverser 235, an alert score propagator 245, a cluster formation engine 255, an alert cluster ranker 265. These subsystems are computer implemented using a variety of different computer systems as presented below in description of FIG. 19. The illustrated subsystem components can be merged or further separated, when implemented. The features of the subsystems are described in the following paragraphs.

Graph Generator

The technology disclosed presents an enterprise network in a graph, with computer network entities represented by nodes connected by edges. The graph generator 225 can use the information in the security log database 175 to determine entities in the network. If a network topology is available, it can begin with a previously constructed node list. The graph generator can also use log data of operations systems such as servers, workstations, caches and load balancers, and network devices (e.g., routers and switches) to build a network topology. The graph generator connects entity nodes using edges that represent different types of relationships between the entities. Examples of entities and relationships are presented above. Alerts can also be represented as edges between nodes. Alert edges can be in addition to other types of edges connecting the nodes. The graph generator further assigns native alert scores to nodes that capture alert scores generated by security systems. In one implementation, the graph generator distributes alerts scores assigned to edges to the nodes connected by the edges. In case of a directed edge, an edge assigned score can be distributed to the node at a source or destination of the edge, instead of both. In case of an undirected or bi-directed edge, the score is distributed between the two nodes connected by the edge. In case of an edge connecting a node to itself (i.e., a loop), the entire score is assigned to the connected node. In another implementation, the technology disclosed retains the scores on edges and uses the edge scores in propagation of native scores to nodes connected with the edges. The graph generator 225 assigns weights to edges connecting the nodes based on a connection type of the edge. The weights represent relationship strength between the nodes connected by the edge. For example, an association type relationship is stronger than an action type relationship as explained above. Therefore, the graph generator can, for example, assign a weight of 1.0 to the edge representing an association type connection and a weight of 0.9 to an edge representing an action type connection. In one implementation, the edge weights are on a scale of 0 to 1. A higher score is given to edges of a connection type representing a stronger relationship.

Graph Traverser

The graph traverser 235 systematically traverses the graph representing the computer network to propagate native scores for alerts associated with the starting nodes with non-zero scores. For each starting node with a non-zero native score, the graph traverser 235 traverses the graph following edges from the starting node to propagate the starting node's native alert score to neighboring nodes. The traversal terminates after visiting a predetermined number of edges or nodes or when the propagated score attenuates below a predetermined threshold. An example pseudocode of a recursive graph traversal algorithm is presented below. In the following pseudocode, the native score of a starting node is referred to as an "initial_score" and an aggregated score of a visited node is referred to as a "priority_score".

Prerequisites: Every node in the graph has an initial_score which can be non-zero or zero. The algorithm computes a new score, the priority_score, for each node by propagation and aggregation. This is initialized to zero for all nodes. The priority_score will be used to determine the clusters.

Comment: Starting with each node with non-zero initial score, we traverse. Every time we start a traversal, we empty the set of visited nodes and spread the initial score of the starting node around.

Start

```
for node in Set( nodes where initial_score > 0 ) do:
    visited_nodes = Set( )
    traverse(node, node.initial_score)
```

Comment: For the traversal, we propagate the starting score around to its neighbors until its magnitude falls below a preset threshold. The scorePropagator function calculates the score to propagate to the neighbors.

```
function traverse(node, score_to_propagate):
    add node to visited_nodes
```

-continued

```
    node.priority_score += score_to_propagate
    if score_to_propagate > threshold:
      for neighbor in node.neighbors where neighbor is not in
      visited_nodes:
        neighbor_score = scorePropagator(node, neighbor)
        traverse(neighbor, neighbor_score)
End
```

Alert Score Propagator

As the graph traverser 235, traverses the graph representing the computer network, the alert score propagator 245 calculates propagated score at visited nodes. For a visited node v, we represent the aggregate score of a node α(v) in equation (1) as sum of its native score and scores propagated to the visited node. The aggregate score, native score and propagated score are referred to as priority_score, initial_score, and neighbor_score, respectively, in the graph traversal pseudocode presented above.

The aggregate score of a node α(v) can be recursively calculated by applying equation (1):

$$\alpha(v) = \sum_{a \in A(v)} \text{score } (a) + \frac{1}{1+W} \sum_{edgetypeT} w_{gms}(T) \sum_{n \in N_T(v)} \frac{1}{|N_T(n)|} \alpha(n)$$

where the base case is presented below in equation (2):

$$\alpha(n) = \sum_{a \in A(n)} \text{score } (a)$$

Tail recursion is one way to propagate a native score from a starting node through connected nodes in the graph.

Equation (1) has two parts. The simpler, first part of equation (1) is a native alert score, a sum of alert scores (α) generated by security systems and assigned to node (v) and/or edges connected to node (v). The same approach can, of course, be applied to scores other than security alert scores, for collapsible graphs other than security graphs.

The second part of equation (1) is a nested sum comprising three terms that represent propagated scores contributed by neighboring nodes n score to the visited node v's score. The propagated score from neighboring node n is attenuated by the three terms.

The outer term $$\frac{1}{1+W}$$

attenuates the propagated score by an inverse of the sum of weights of edges $W=\Sigma(w_{gms}(T))$ of all connection types T incident on the visited node v. The added 1 in the denominator assures attenuation and prevents a divide by zero condition.

The outer summation $\Sigma_{edgetypeT} w_{gms}(T)$ iterates over edge types incident to the visited node v. This term attenuates propagated scores for a particular edge type T by a weight $w_{gms}(T)$ assigned to an edge of connection type T. In general, edge types in the graph are assigned weights corresponding to the strength of the relationship of the connection type represented by the edge. The stronger the relationship, the higher the weight. A weight for a particular edge type T is applied to an inner sum—the outer and inner sums are not calculated independently.

Finally, the inner summation $$\sum\nolimits_{n \in N_T(v)} \frac{1}{|N_T(n)|} \alpha(n)$$

iterates over edges of type T to calculate an average score for nodes connected to visited node v by each edge type. The denominator factor $N_{T(v)}$ represents the number of neighbors of the visited node that are connected to the visited node with a same edge connection type T.

Equation (1) is conceptual, whereas the graph traversal pseudocode, above, is practical. Equation (1) defines one recursive calculation of an aggregate score that applies to any node in a graph representing the computer network. Applying Equation (1) directly would involve fanning out from a starting node to draw propagated scores from neighboring nodes into the starting node. The graph traversal pseudocode follows a different, more practical strategy to calculate the propagated scores. It can start at nodes that have non-zero native alert scores and traverse the graph of computer network, avoiding cyclic calculation mistakes. Alternatively, the traversal can start at leaf nodes, or at both leaf and interior nodes, or at some selected subset of all the nodes in the graph. In some implementations, the propagation can be stopped after the propagated score falls below a threshold, as reflected in the pseudocode for graph traversal. In another implementation, the native scores can be propagated from a starting node for a given number of network hops, for example, the scores can be propagated up to five edge or network hops from the starting node. Graph traversal pseudocode presented above is one practical example that applies Equation (1). It is understood that other graph traversal algorithms can be applied to propagate scores.

Cluster Formation Engine

The cluster formation engine 255 uses the aggregate scores for nodes in the graph of computer network to form clusters of connected nodes. The graph formation engine sorts the nodes in the graph in a descending order of aggregate scores. Starting with the node with a highest aggregate score, the cluster formation engine 255 traverses the graph and adds a neighboring node in a cluster if the aggregate score of the neighboring node is above a selected threshold. When the cluster formation engine 255 reaches a node that has an aggregate score below a set threshold, the chain of connected nodes in the cluster is broken. The threshold can be a predetermined aggregate score or a ratio of scores between nodes, or a combination of both. When using a ratio of scores, the chain of connected nodes can be broken when one node in a pair of connected nodes has a score greater than ten times the other node in the pair of connected nodes. It is understood that when using a ratio of scores, the threshold for breaking the chain of connected nodes can be set at greater at a higher value. For example, the chain of connected nodes can be broken when one node in a pair of connected nodes has a score fifteen, twenty, or twenty five times the score of the other node. Similarly, the threshold for breaking the chain of connected nodes can be set at values lower values. For example, the chain of connected nodes can be broken when one node in a pair of connected nodes has a score five times, three times or two times the score of the other node.

Alert Cluster Ranker

The alert cluster ranker 265 ranks and prioritizes clusters formed by the cluster formation engine 255. Alert cluster ranker 265 calculates cluster scores by summing aggregate scores of nodes in the cluster. The clusters of connected nodes are displayed to the security analyst who can then focus on high ranking clusters first before reviewing the other clusters.

In the following sections, we describe the technology disclosed using two example graphs of computer networks. The examples start with a graph of a computer network in which native scores are assigned to nodes, based on alerts, and weights are applied to edges, based on connection types. The formulation presented in equation 1 is used to propagate native scores of starting nodes to connected nodes. Aggregate scores for nodes are calculated by summing propagated scores and native scores. Finally, clusters are formed. The first example results in one large cluster of connected nodes in the graph. The second example results in two small clusters of connected nodes in the graph.

First Example of Alert Prioritization

Figure 3:
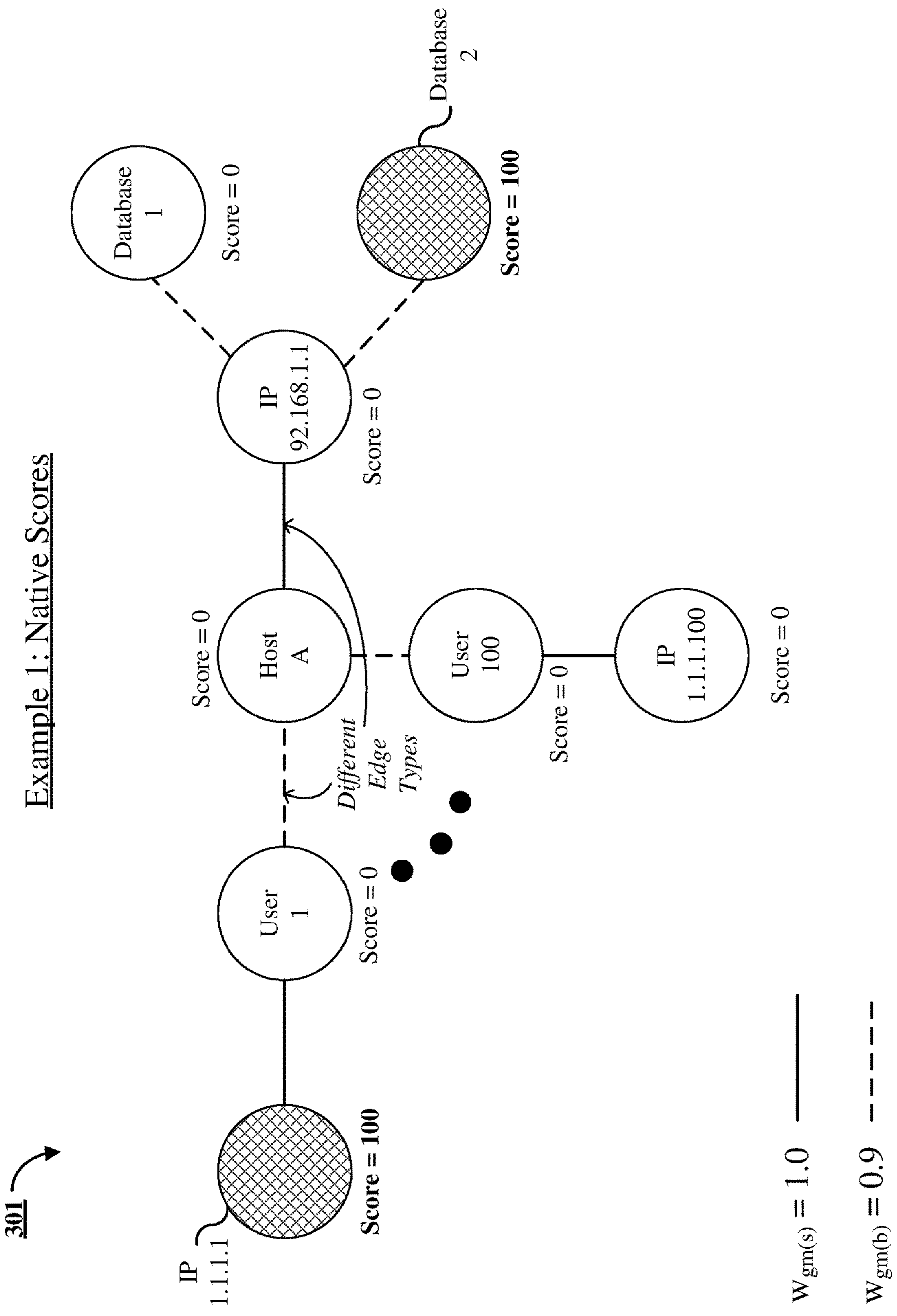
FIG. 3 illustrates native scores assigned to nodes in a first example graph of an enterprise network.

FIG. 3 presents a graph 301 of a computer network in which a host A is connected to a hundred users (user 1 to user 100). Users are connected to the host through an action type connection which is represented by broken lines connecting user nodes with the host A node. Each user has an IP address which is represented as a node and connected to respective user node through an association type connection. For example, the node representing IP address 1.1.1.1 is connected to user 1 and the node representing IP address 1.1.1.100 is connected to user 100. The association type connection is represented by solid lines in the graph 301. Users 2 through 99 and corresponding IP addresses are not shown in the graph to simplify the example for explanation purposes. The host A is connected to a node representing its IP address 92.168.1.1 through an association type connection. The host is communicating with two databases: database 1 and database 2. The two databases are connected to host A via the node representing the host's IP address 92.168.1.1 node. The IP address 92.168.1.1 has action type connections with the two database nodes.

Two nodes, IP 1.1.1.1 and database 2, in the graph 301 have non-zero native alert score and are thus selected as starting nodes. The node representing IP address 1.1.1.1 has a native alert score of 100 and the node representing the database 2 also has a native alert score of 100. Starting nodes are shown with cross-hatch pattern in the graph. All other nodes in the graph have native scores of zero. Edges representing association type connections, drawn as solid lines, have a weight of 1. Edges representing action type connections, drawn as broken lines, have a weight of 0.9. As described above, association type connection is stronger than action type connection.

Figure 4A:
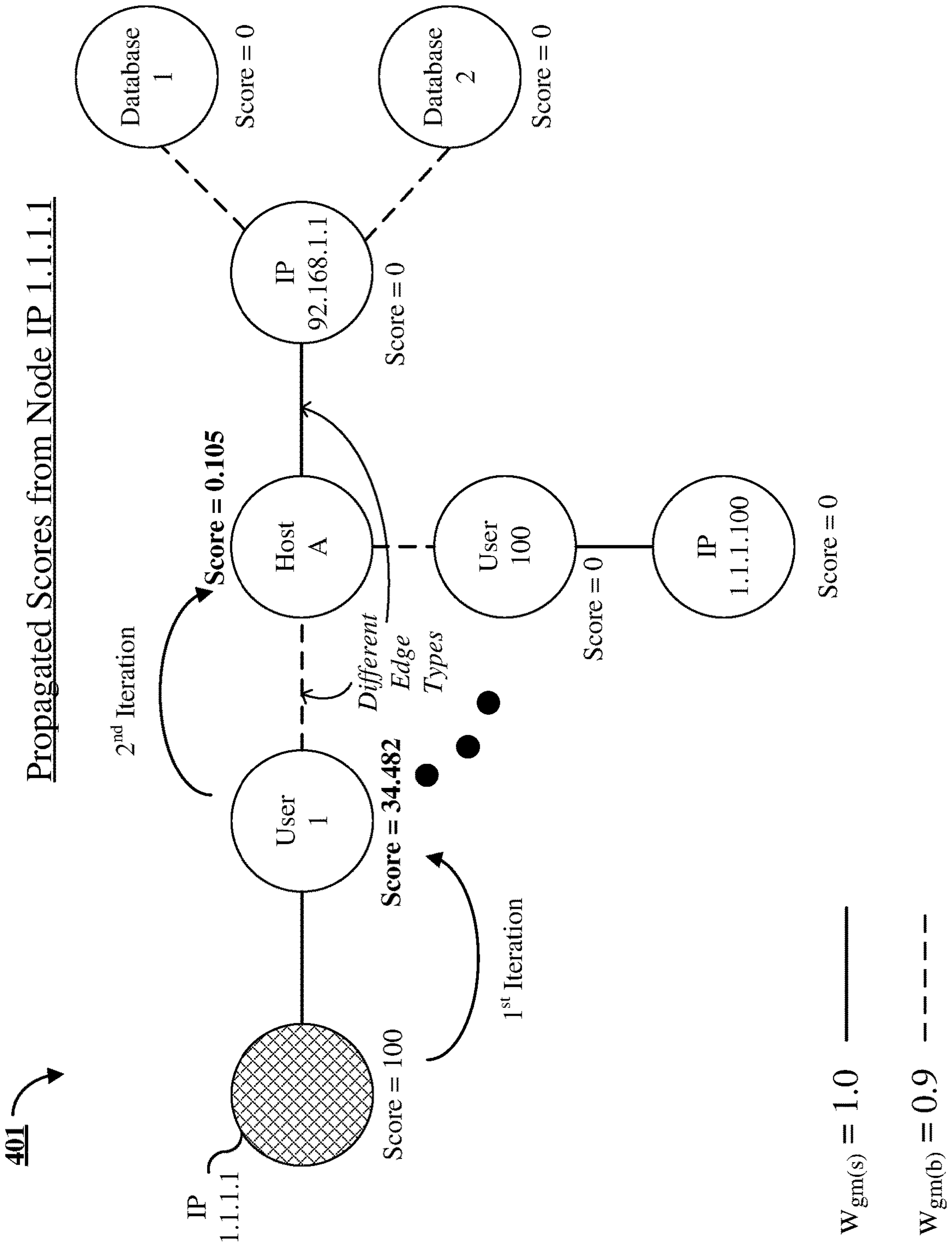
FIGS. 4A, 4B, and 4C illustrate propagated scores from a first starting node in the first example graph presented in FIG. 3.

A first set of figures (FIGS. 4A to 4C) illustrates the propagated impact of native alert score on connected, neighboring nodes when the node representing IP 1.1.1.1 is selected as the starting node. The starting node IP 1.1.1.1 is shown with a cross-hatch pattern in a graph 401. First two iterations of propagation of native score from the starting node are shown in the graph 401. In the first iteration, the propagated score from starting node 1.1.1.1 to user 1 node is 34.482 and in the second iteration the propagated score to the host A node is 0.105. It can be seen IP 1.1.1.1 nodes propagates a higher (34.482) score to user 1 in the first iteration. While in the second iteration, a very small score (0.105) is propagated to host A node. The large attenuation of propagated score to the host A is due to a hundred user nodes connected to the host A node through edges of the same connection type. This makes the denominator in the term $$\frac{1}{|N_T(n)|}$$

in equation (1) as 100. Therefore, the contribution of user 1 node to the propagated score of host A node is very small (0.105) because there are a hundred similar users connected to the same host A node.

Figure 4B:
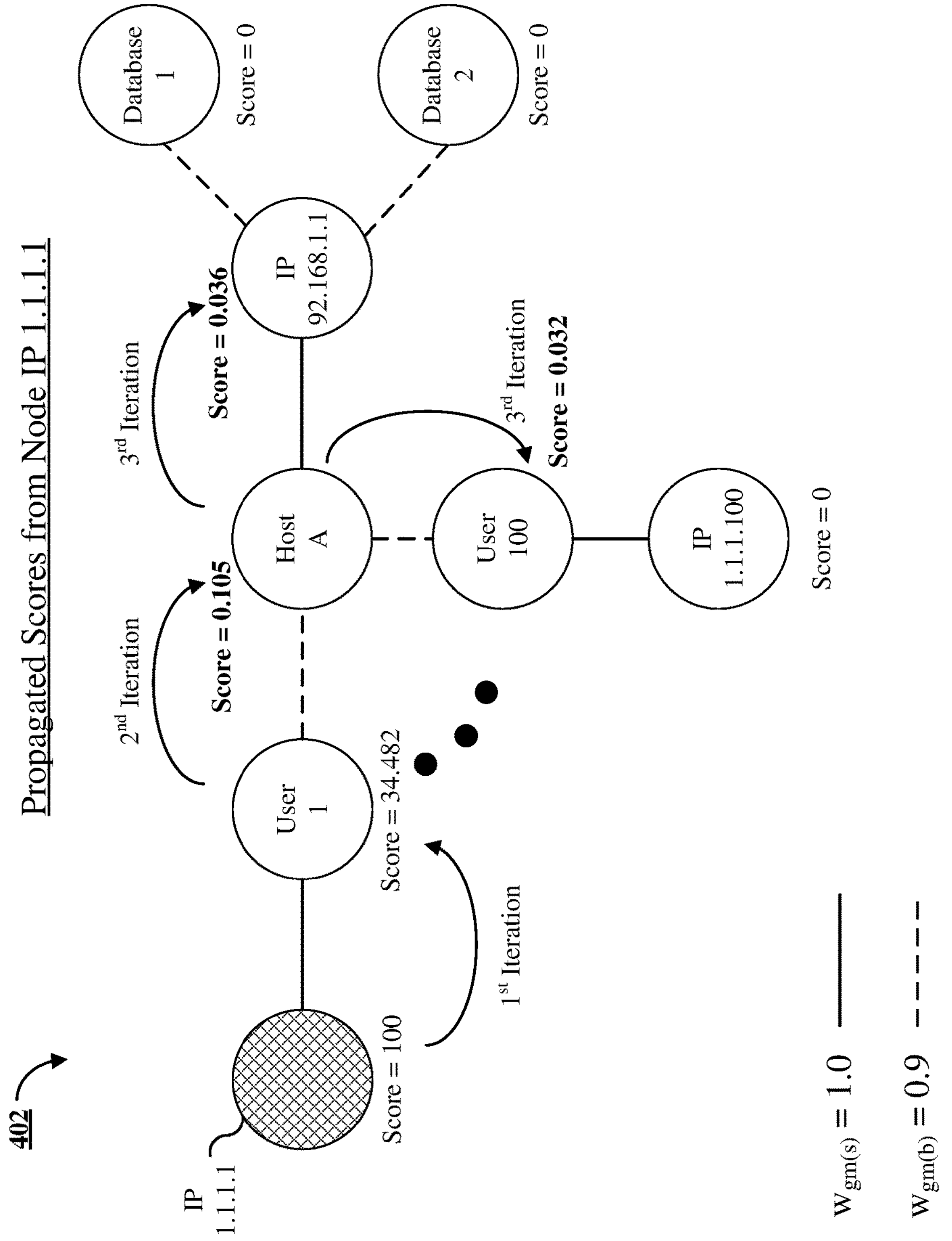
Figure 4C:
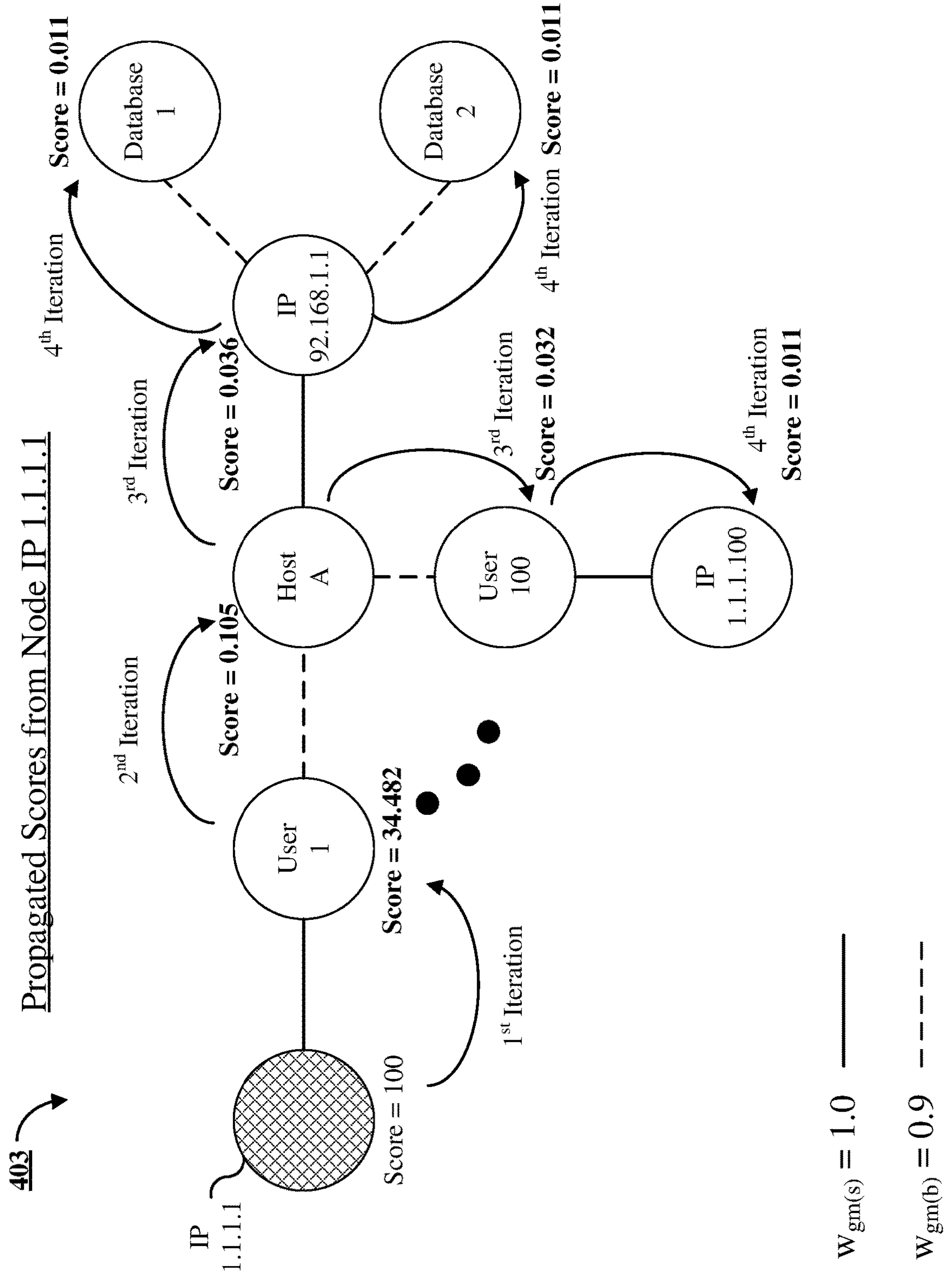

Propagated scores from IP 1.1.1.1 node in a third iteration are illustrated in a graph 402 in FIG. 4B. The host A node is connected to two nodes in addition to the user 1 node which is already visited in the previous iteration. Note that we are not showing the nodes for user 2 through user 99 connected to host A to simplify the example for illustration purposes. The host A node propagates the score to all connected nodes, except the nodes that have been visited in a previous iteration. As shown in the graph 402, the host A node propagates a score of 0.032 to each one of the two nodes IP 92.168.1.1 and user 100. A graph 403 in FIG. 4C illustrates the propagated scores in a fourth iteration. Nodes representing database 1, database 2 and IP 1.1.1.100 each receive a score of 0.011 in the fourth iteration.

Figure 5A:
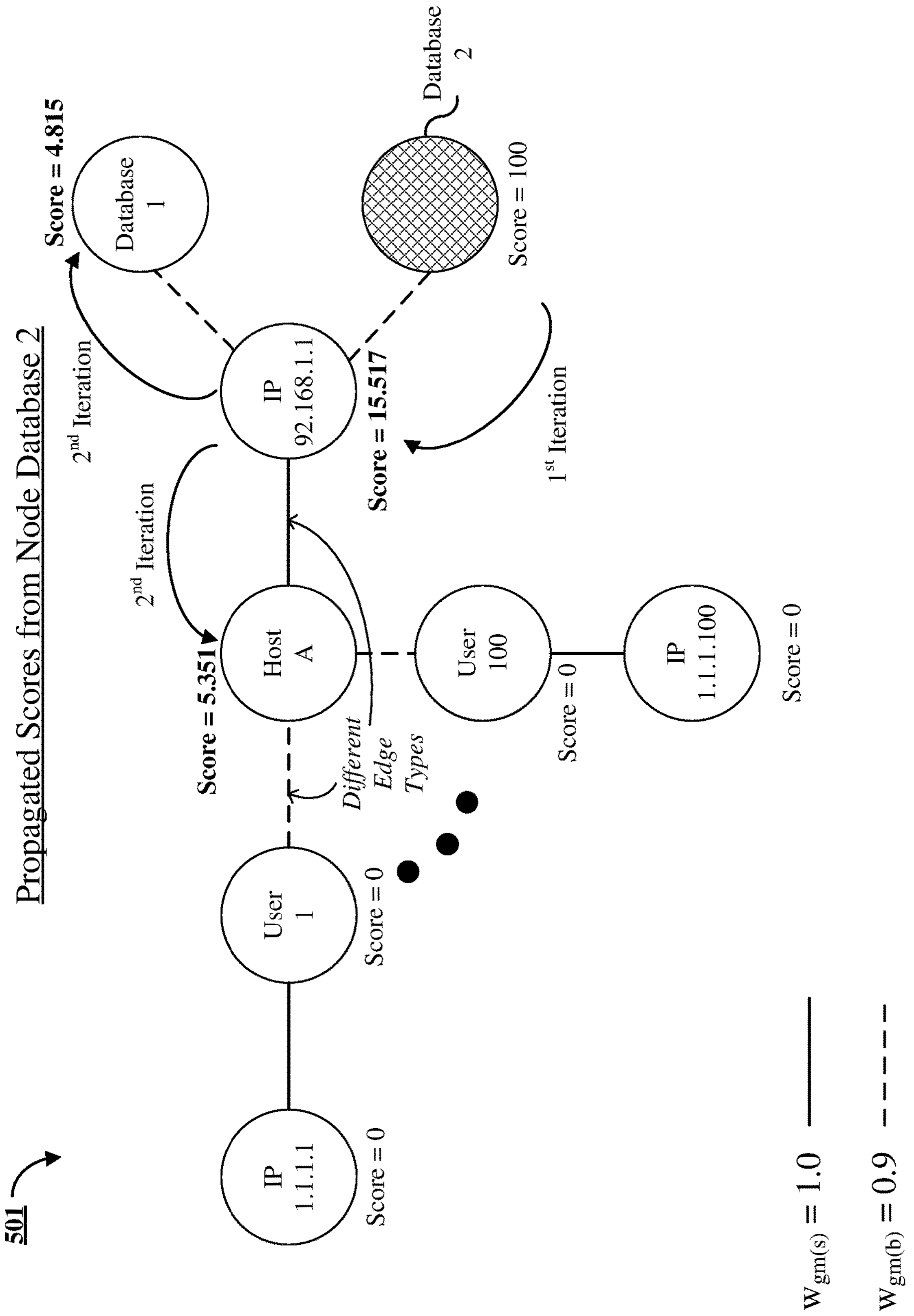
FIGS. 5A, 5B, and 5C illustrate propagated scores from a second starting node in the first example graph presented in FIG. 3.

Continuing with the first example, a second set of figures (FIGS. 5A to 5C) illustrates the propagated impact of native alert score on connected, neighboring nodes when the node representing database 2 is selected as the starting node. The starting node database 2 is shown with a cross-hatch pattern in a graph 501 in FIG. 5A. First two iterations of propagation of native score from the starting node are shown in the graph 501. In the first iteration, the propagated score to IP 92.168.1.1 node is 15.517. In the second iteration, host A node receives a score of 5.351 and database 1 node receives a score of 4.815. It can be seen that a higher value of score is propagated to host A from IP 92.168.1.1 as compared to the score propagated from user 1 node to host A when the starting node was IP 1.1.1.1. This is because IP 92.168.1.1 is the only node connected to the host A node with an association type connection while user 1 is one of 100 nodes connected to the host A with an action type connection.

Figure 5B:
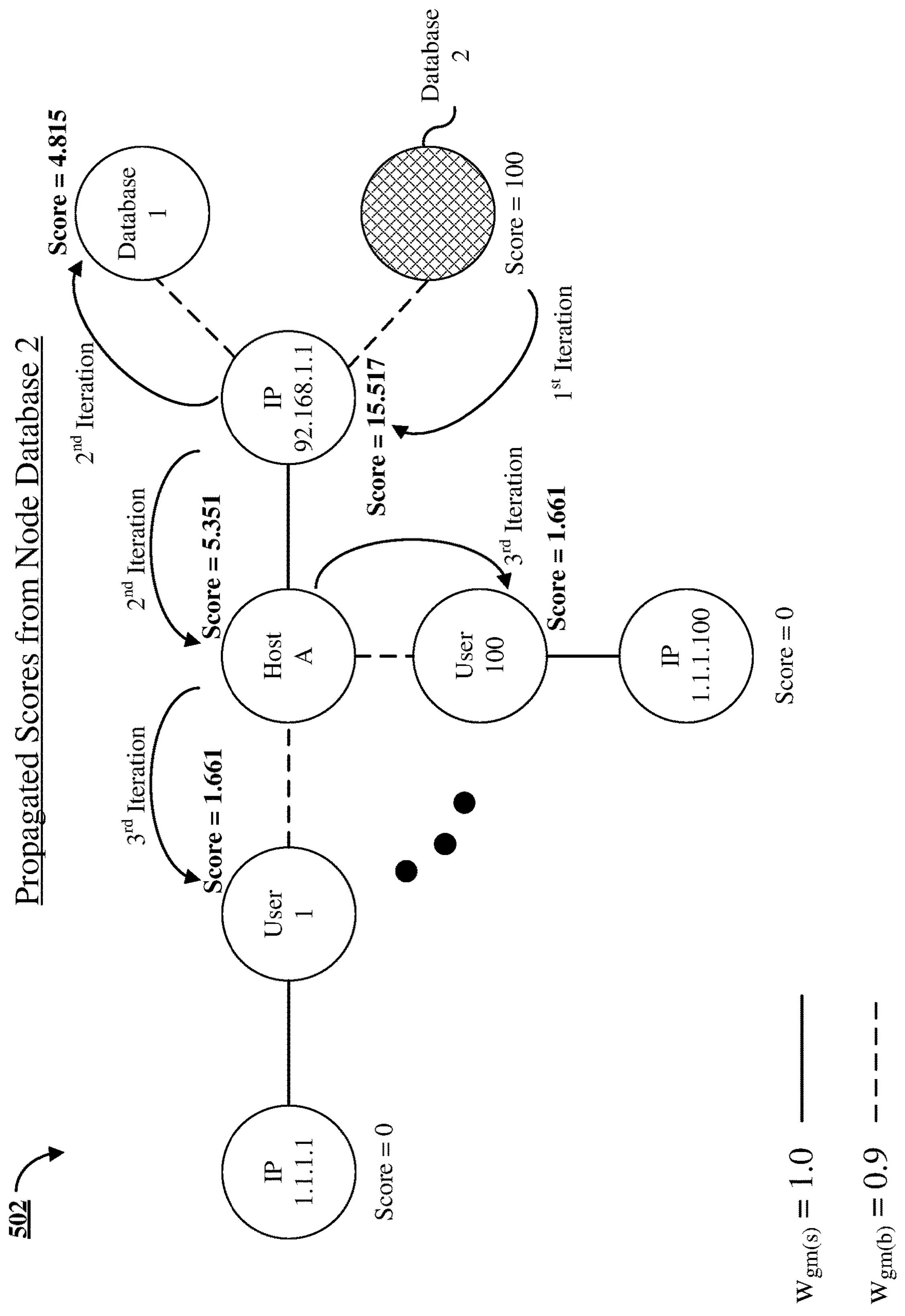
Figure 5C:
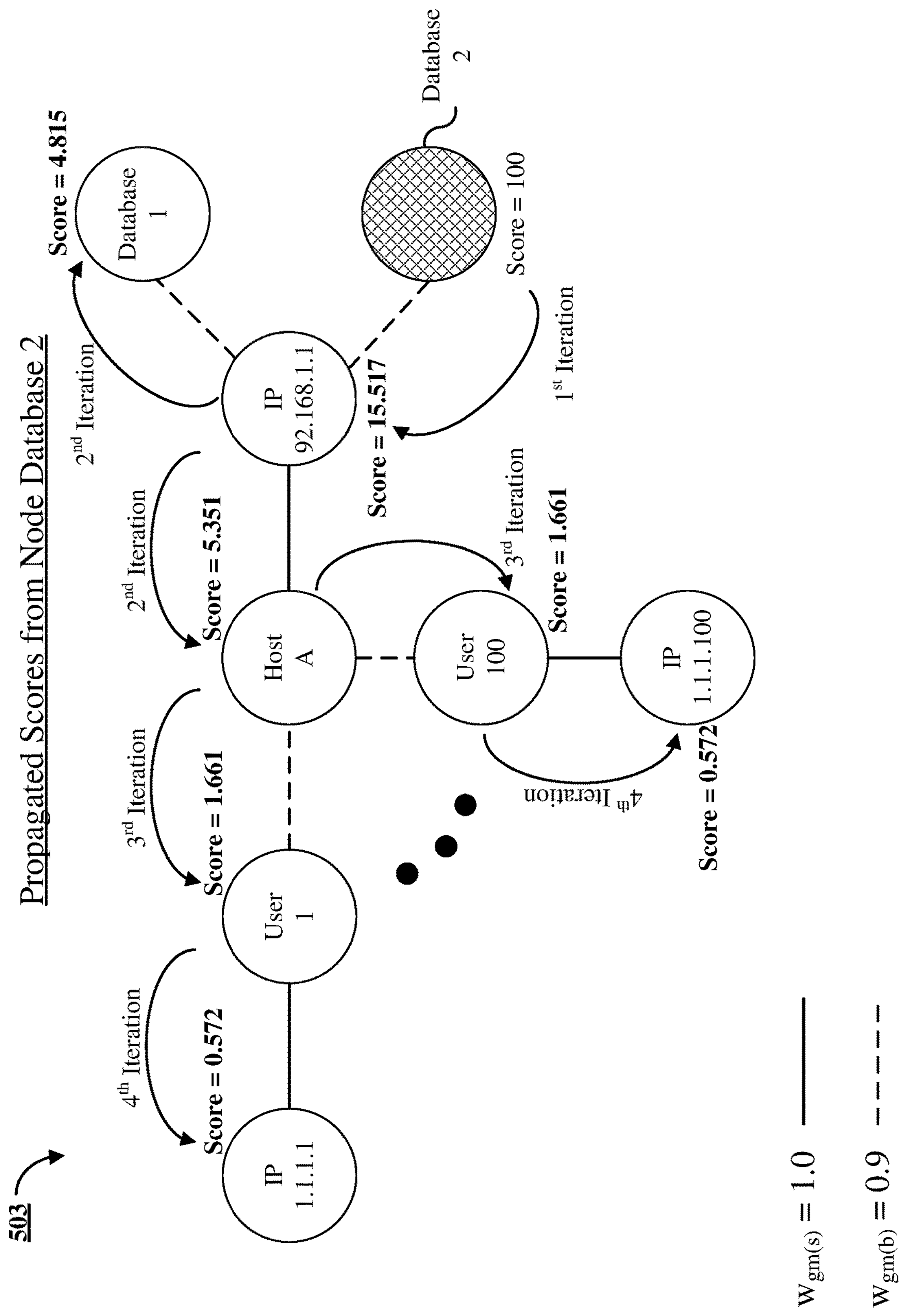

A third iteration of propagation of scores from the database 2 node is shown in FIG. 5B in a graph 502. In the third iteration, a score of 1.661 is propagated to each of the two nodes representing user 1 and user 100. Finally, in FIG. 5C, a fourth iteration of the propagated scores from starting node database 2 is illustrated in a graph 503. In the fourth iteration, a score of 0.572 is propagated to each of the two nodes representing IP 1.1.1.1 and IP 1.1.1.100.

Figure 6:
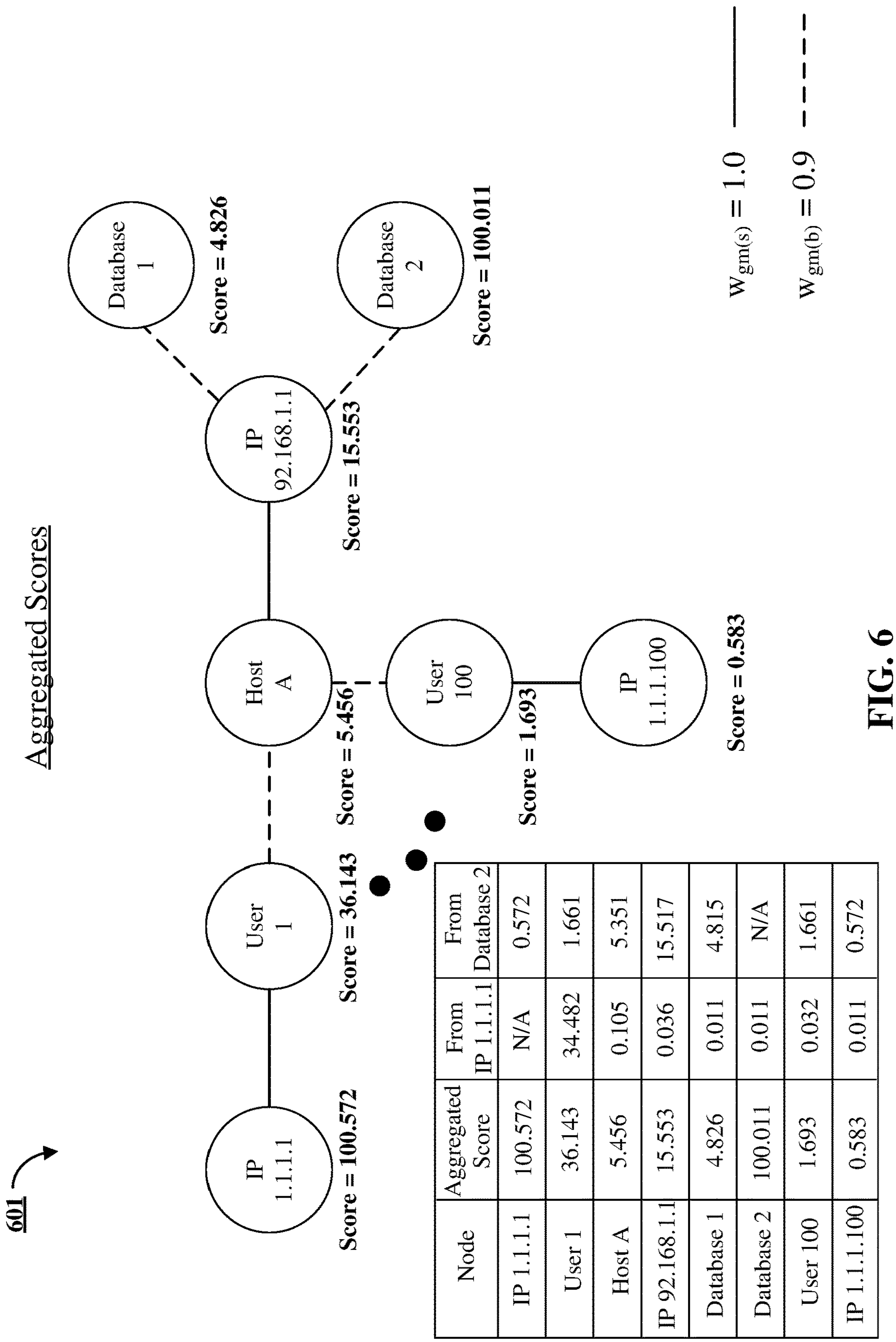
FIG. 6 presents aggregate scores for nodes in the first example graph presented in FIG. 3.
Figure 7:
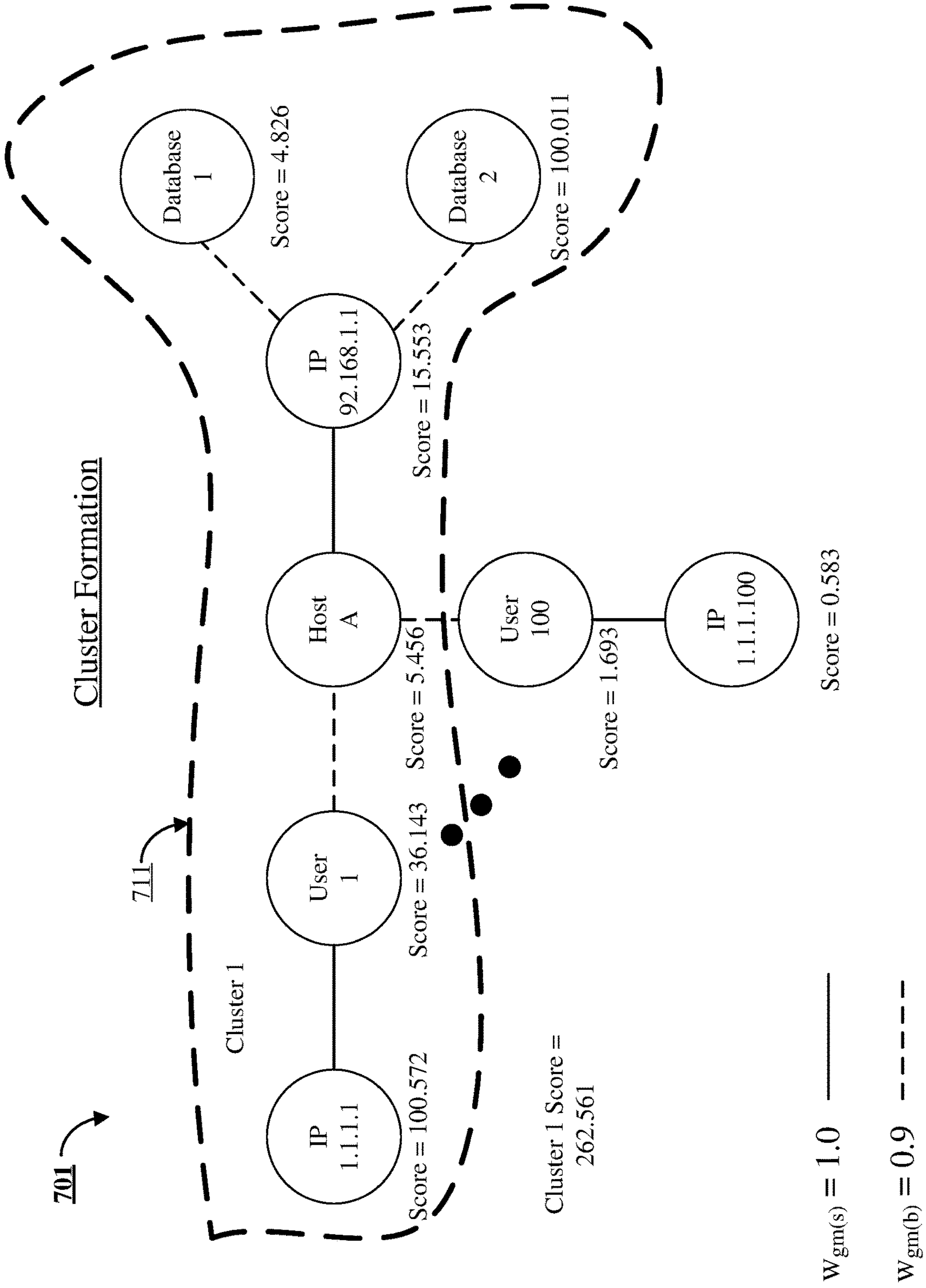
FIG. 7 presents cluster formation of connected nodes in the first example graph presented in FIG. 3.

FIG. 6 presents a graph 601 illustrating aggregate scores for the nodes in the first example. The aggregate score of a node in the graph is calculated by summing its native score with the propagated scores in the two propagations from two starting nodes with non-zero scores as presented above. The aggregate scores for each node are shown in the graph beside each node. The aggregate scores are also shown in a tabular format which shows the contribution to aggregate scores from the two propagations, the first with starting node IP 1.1.1.1 and the second with starting node database 2, respectively. Node representing IP 1.1.1.1 has the highest aggregate score and is therefore, selected as a starting node to form clusters of connected nodes. The cluster formation is presented in a graph 701 in FIG. 7. Starting with the node representing IP 1.1.1.1, the connected node user 1 is selected for evaluation to form a cluster. Aggregate score of the node representing user 1 is above a selected threshold of 2, therefore it is included in the cluster. Following this, the next node is host A having an aggregate score of 5.456 which is above the threshold and is also included in the cluster. The node representing host A is connected to the node representing IP 92.168.1.1 which has an aggregate score of 15.553 which is above the threshold value of 2 and is therefore included in the cluster. The node representing host A is also connected to the node representing user 100 which has a score of 1.693 which is below the threshold value of 2, therefore it is not included in the cluster. Node representing user 100 therefore, breaks the chain connecting the node representing host A and the node representing IP 1.1.1.100. Continuing to the third neighbor of host A, the node representing IP 92.168.1.1 is connected to the two nodes representing the database 1 and database 2, each having an aggregate score above the threshold value of 2. Therefore, database 1 and database 2 nodes are included in the cluster. The cluster of connected nodes is shown inside a cluster boundary 711. The cluster is labeled as cluster 1 and its score is 262.561 which is the sum of aggregate scores of all nodes included in the cluster 1.

Second Example of Alert Prioritization

Figure 8:
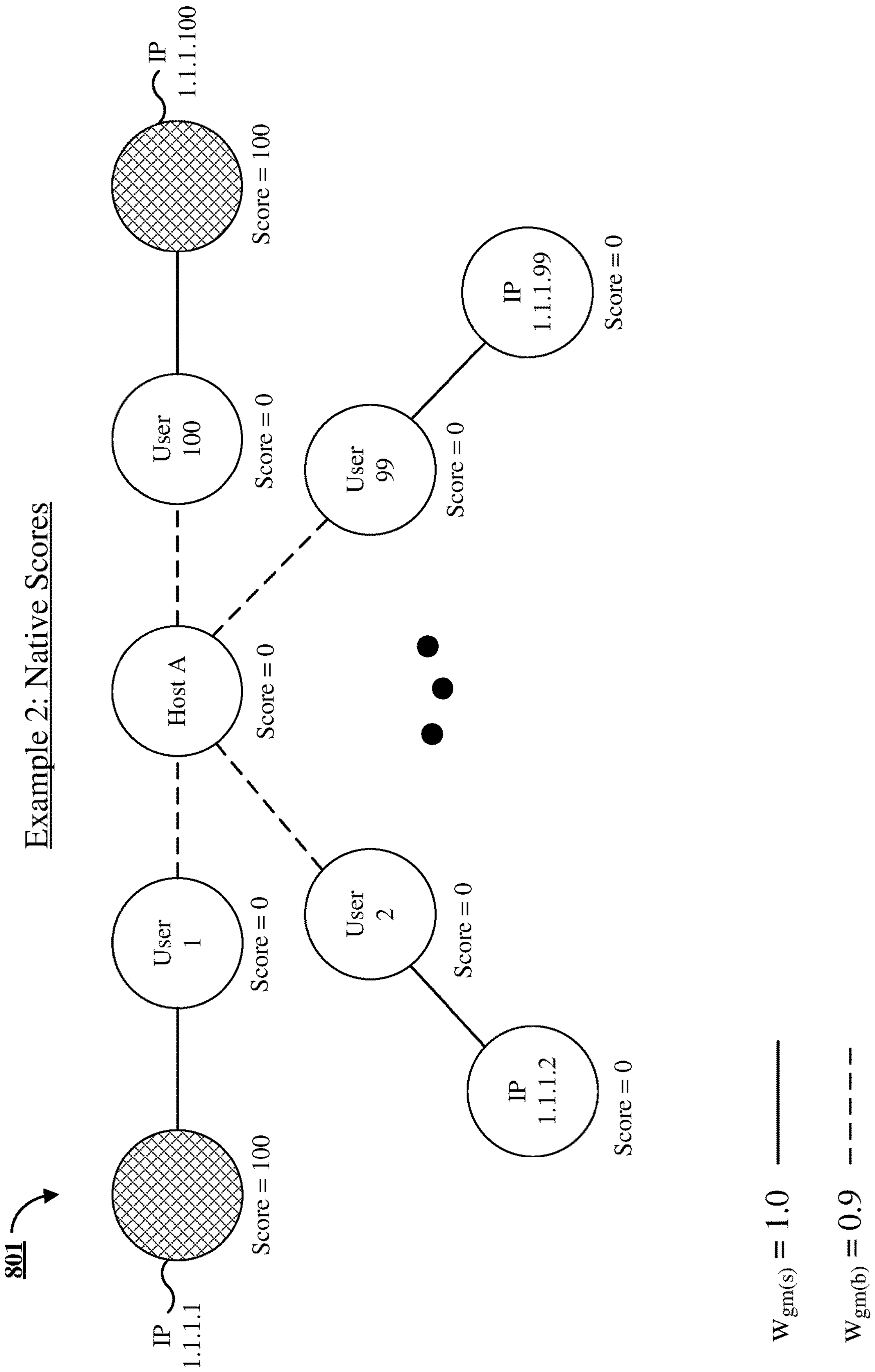
FIG. 8 illustrates native scores assigned to nodes in a second example graph of an enterprise network.

FIG. 8 presents a graph 801 of a computer network in which a host A is connected to a hundred users (user 1 to user 100). Users are connected to the host A through an action type connection which is represented by edges drawn as broken lines connecting user nodes with the host A node. Each user has an IP address which is represented as a node and connected to respective user through an association type connection. For example, the node representing IP 1.1.1.1 is connected to the node representing user 1, the node representing IP 1.1.1.2 is connected to the node representing user 2, the node representing IP 1.1.1.99 is connected to the node representing user 99 and the node representing IP 1.1.1.100 is connected to a node representing user 100. Users 3 through 98 and corresponding IP addresses are not shown in the graph to simplify the structure of the graph for illustration. Two nodes in the graph 801 have non-zero native alert score. The node representing IP address 1.1.1.1 has a native alert score of 100 and the node representing IP address 1.1.1.100 also has a native alert score of 100. These two nodes having non-zero native alerts scores are shown in the graph 801 with a cross-hatch pattern. All other nodes in the graph have native alert scores of zero. Edges drawn as solid lines represent association type connections and edges drawn as broken lines represent action type connections. As in example 1, edges representing association type connections are assigned weights of 1.0 indicating a higher relationship strength between the connected nodes. Edges representing action type connections are assigned weights of 0.9 indicating relatively lower relationship strength between the connected nodes.

Figure 9:
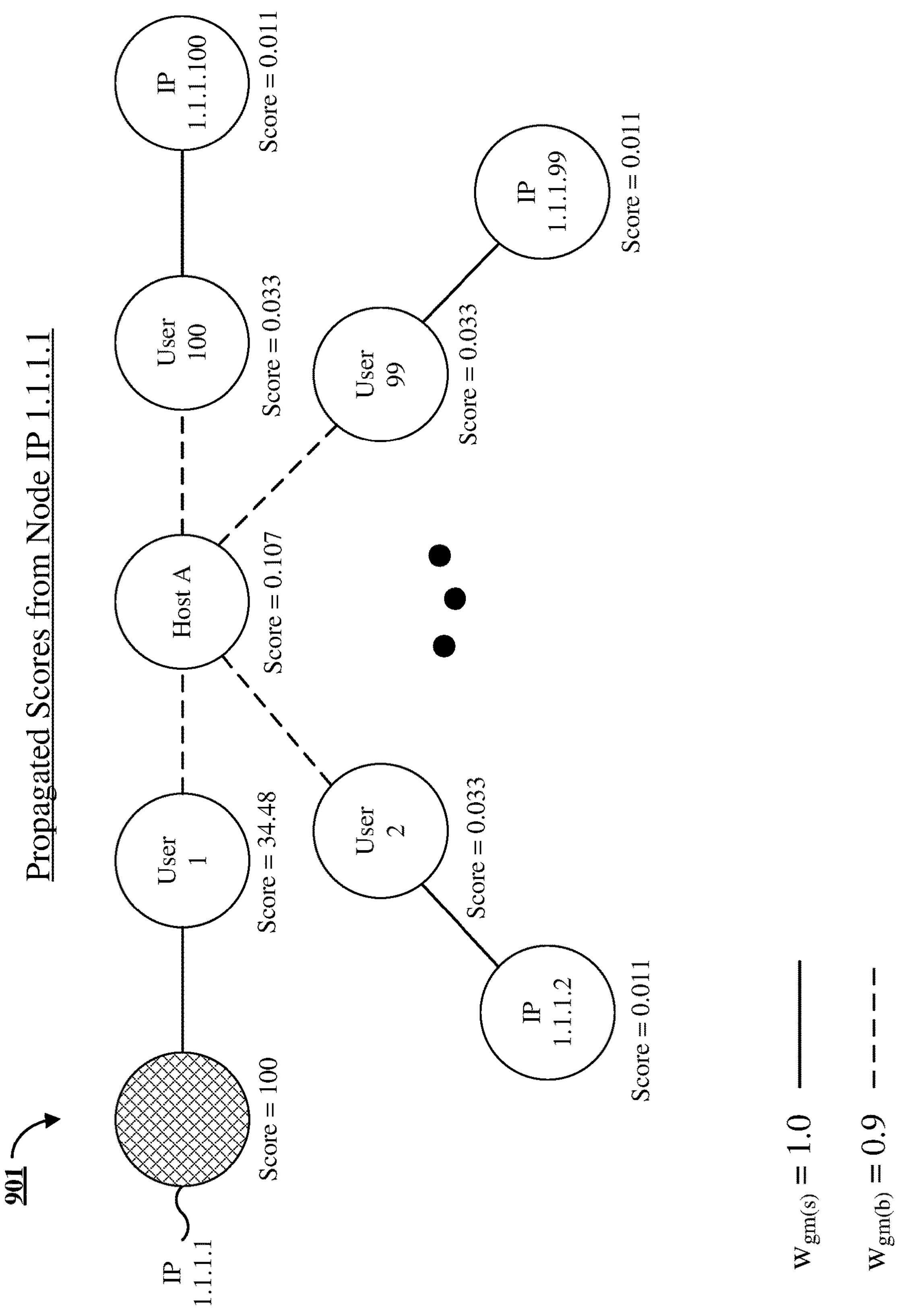
FIG. 9 presents propagated scores from a first starting node in the second example graph presented in FIG. 8.

In the following two figures, we illustrate propagated impact of native alert scores on connected, neighboring nodes when each of the two nodes with non-zero alert scores are selected as starting nodes one by one. FIG. 9 presents a graph 901 propagation of native alerts scores when the node representing IP 1.1.1.1 is selected as a starting node. Each iteration in the propagation is not shown separately as in the first example. The propagation of native alert score from IP 1.1.1.1 starts with the node representing user 1 getting a score of 34.48 in the first iteration. Following this, in the second iteration, the node representing host A gets a score of 0.107. Note that the propagation of alert scores from user 1 to host A is considerably attenuated because one hundred edges of the same connection type connect one hundred user nodes to host A. As user 1 is only one of a hundred user nodes connected to the node representing host A, its contribution to host A's propagated alert score is very low. In the next iteration, user 2, user 99, and user 100 gets propagated alert scores which are 0.033 each. In the last iteration, nodes representing IP 1.1.1.2, IP 1.1.1.99, and IP 1.1.1.100 get propagated scores of 0.011 each.

Figure 10:
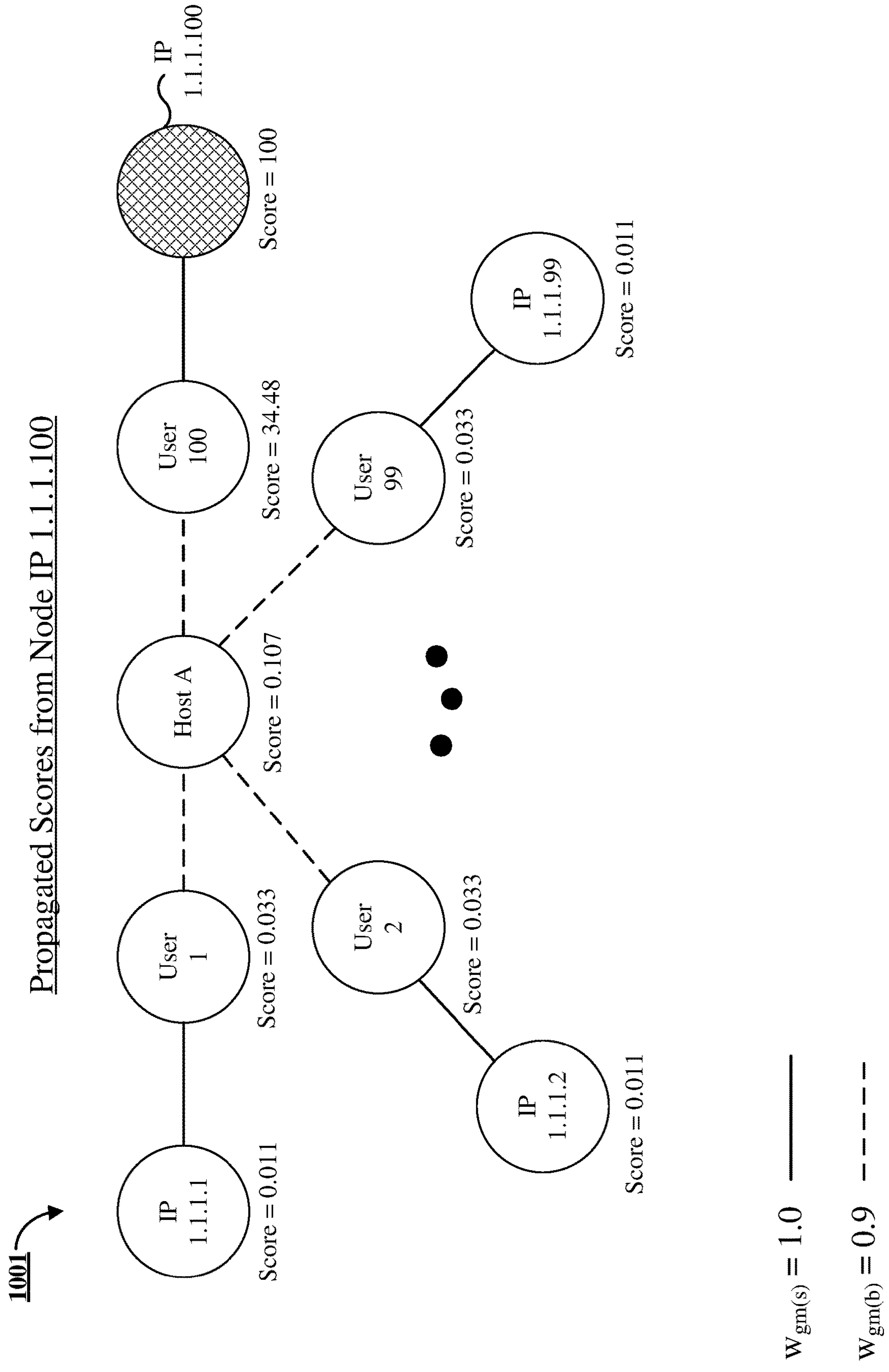
FIG. 10 presents propagated scores from a second starting node in the second example graph presented in FIG. 8.
Figure 11:
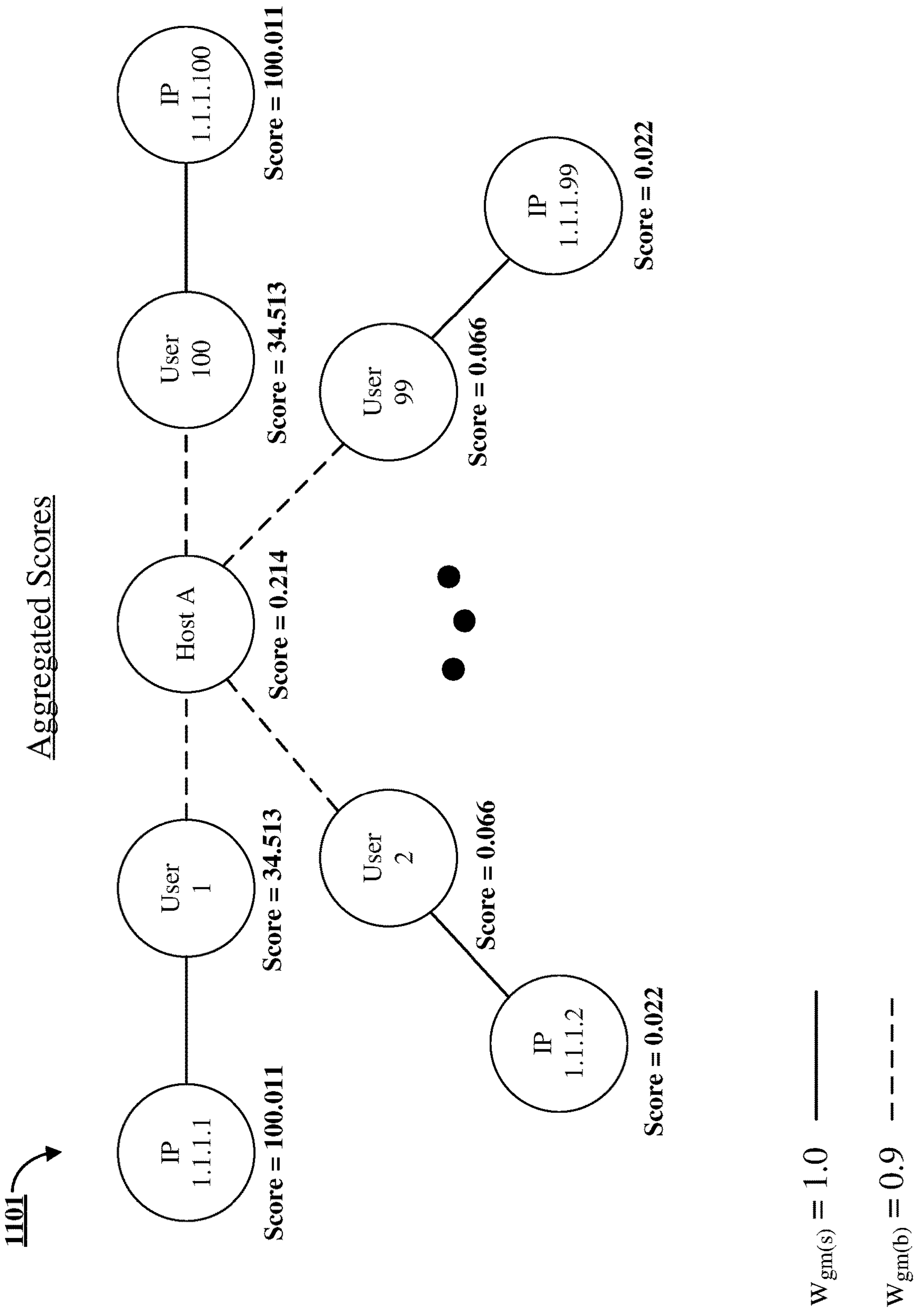
FIG. 11 presents aggregate scores for nodes in the second example graph presented in FIG. 8.

FIG. 10 presents a graph 1001 illustrating propagation of native alerts scores when the node representing IP 1.1.1.100 is selected as a starting node. In the first iteration, user 100 receives a propagated alert score of 34.48. In the second iteration, the host A receives a propagated alert score of 0.107. In the third iteration, user 1, user 2, and user 99 receive a propagated alert score of 0.033 each. Finally, in the fourth iteration, the nodes representing IP 1.1.1.1, IP 1.1.1.2, and IP 1.1.1.99 receive propagated alert scores of 0.011 each. FIG. 11 presents aggregate scores for each node in example 2 illustrated in a graph 1101. The aggregate scores for nodes are calculated by summing their respective native scores from FIG. 8 with propagated scores in FIGS. 9 and 10. The nodes representing IP 1.1.1.1 and IP 1.1.1.100 have highest aggregate scores of 100.011 each. Therefore, each one of these nodes is selected one by one to form clusters of connected nodes.

Figure 12:
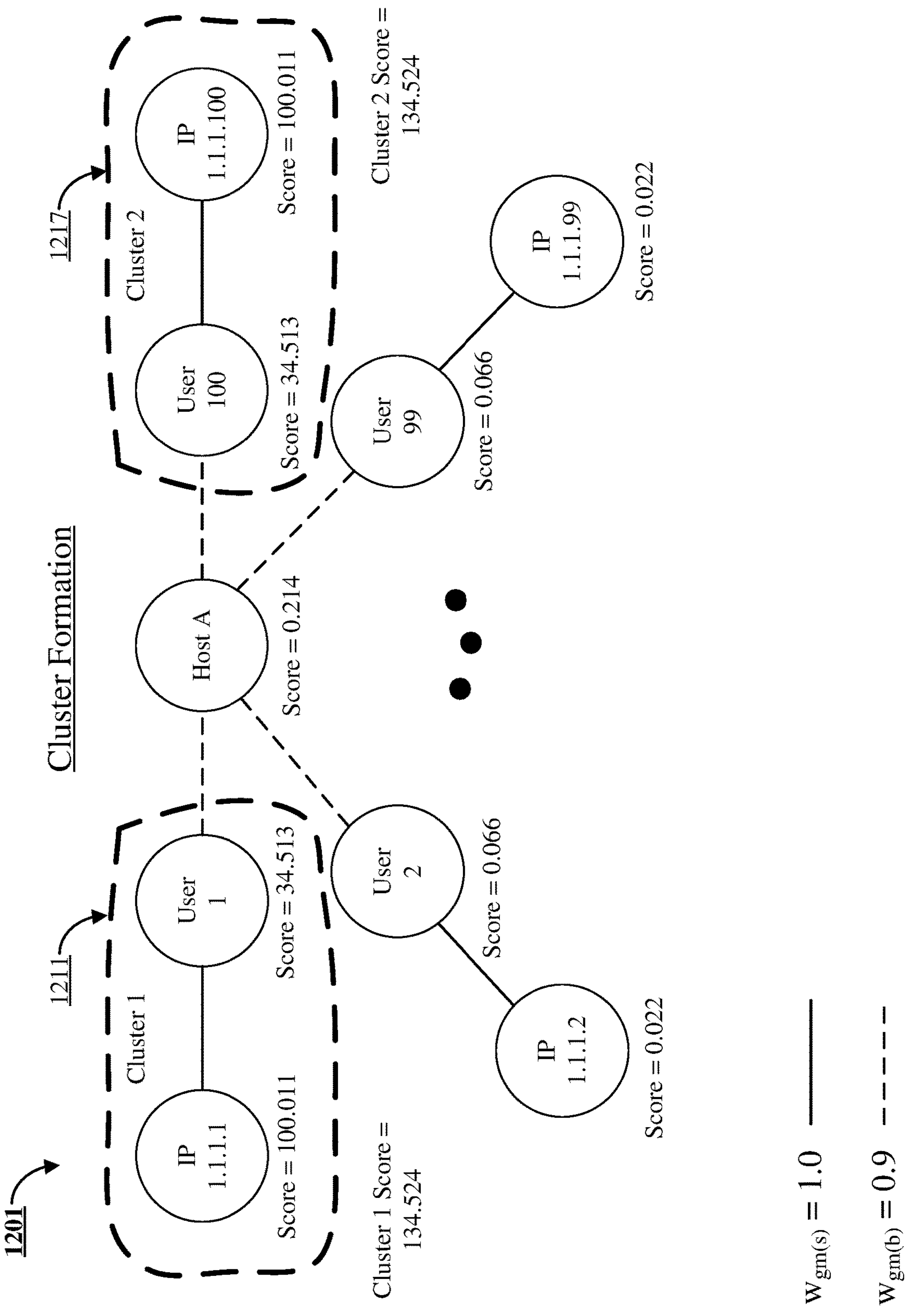
FIG. 12 presents cluster formation of connected nodes in the second example graph presented in FIG. 8.

Cluster formation is illustrated in a graph 1201 in FIG. 12. The cluster formation starts with selection of one of the two nodes having highest aggregate score. We start with the node representing IP 1.1.1.1 and compare the aggregate score of the connected node representing user 1 with a selected threshold. In this example, we compare a ratio of the aggregate scores in a pair of the connected nodes with a threshold. For a pair of connected nodes, if the aggregate score of one of the connected nodes is more than 10 times the aggregate score of the other node in the pair we break the chain and the nodes in the pair can be part of separate clusters. The ratio of the aggregate scores is calculated by dividing 100.11 by 34.513 which results in 2.89 which is less than 10 therefore, a cluster 1 is formed which includes the nodes representing IP 1.1.1.1 and user 1. In the next iteration, a ratio of aggregate scores of node representing user 1 and the node representing host A is calculated by dividing the aggregate score of user 1 (34.513) by aggregate score of host A (0.214), which results 161.27. As this is greater than 10, we break the chain. Therefore, cluster 1 is formed by including two nodes representing IP 1.1.1.1 and user 1. Following this, a similar sequence of steps is applied starting with node 1.1.1.100 which has an aggregate score of 100.011. This results in formation of cluster 2 including the nodes representing IP 1.1.1.100 and user 100. The two clusters are presented with respective boundaries 1211 and 1217 in the graph 1201. The scores of both clusters are 134.524 giving them equal rank. Both clusters are then presented to security analyst for further analysis.

The above examples illustrate that propagated score on a visited node depends on the strength of the relationship from the starting node and the number of edges of the same type connected with the visited node. The attenuation in the propagated score is greater if the relationship strength is weak and many edges of the same connection type are connected with the visited node. This attenuation is illustrated in the two examples above when propagating native score from user node to host node. As there are a hundred user nodes connected to the same host node, the host receives a very small amount of propagated score when traversal is from the user node to the host node.

System Components—Equivalence Collapser

Figure 13:
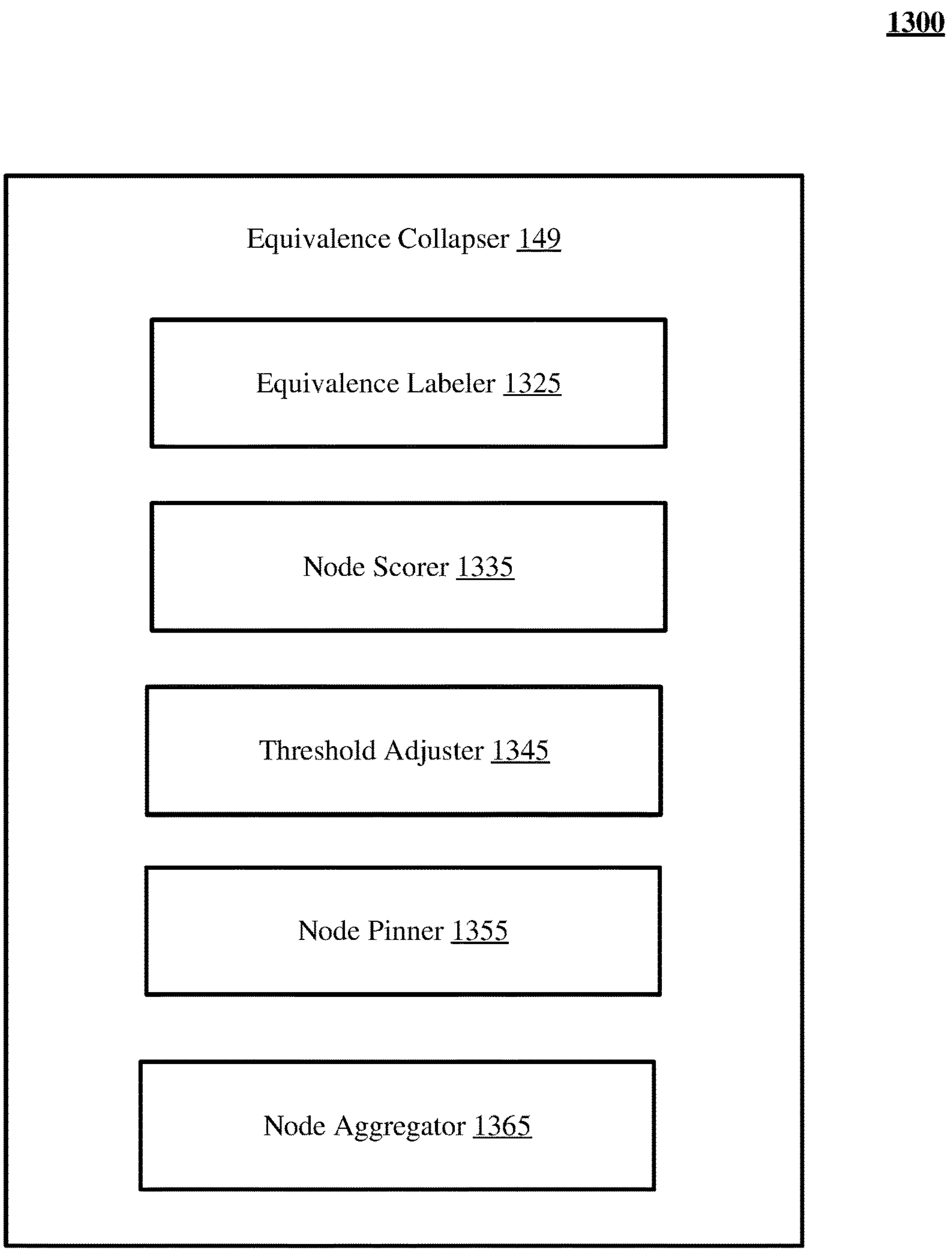
FIG. 13 is a block diagram of example components of the equivalence collapser of FIG. 1.

FIG. 13 is a high-level block diagram 1300 illustrating subsystem components of the equivalence collapser 149. The subsystems include an equivalence labeler 1325, a node scorer 1335, a threshold adjuster 1345, a node pinner 1355, and a node aggregator 1365. These subsystems are computer implemented using a variety of different computer systems as presented below in description of FIG. 19. The illustrated subsystem components can be merged or further separated, when implemented. The features of the subsystems are described in the following paragraphs.

Equivalence Generator

The first step to perform equivalence labelling, according to a method disclosed, is to assign degree labels to nodes in the graph, which aid in determining equivalent nodes. A group of nodes with a same label belong to the same equivalence class and can be collapsed to a single equivalence node. Equivalence labeler 1325 assigns these labels to nodes. In one implementation, the equivalence labeler assigns labels to nodes in an increasing order of degree of connectedness of the nodes. For example, all nodes with degree of 1 in the graph are assigned labels before the nodes with degree of 2 and so on. In such an implementation, the process to assign labels starts with the nodes having a degree of 1 in the graph. The equivalence labeler 1325 assigns labels to nodes with degree of 1 such that nodes with matching labels are in the same group of equivalent nodes. The equivalence labeler 1325 considers the degree of the node, its neighboring node and connection type of the node when assigning labels. Nodes having the same degree, connected to the same neighbor node with the same connection type are given the same label. The label assignment process continues until all equivalent nodes in the graph have been assigned labels.

Efficiency can be improved by limiting application of labels to nodes, based on rules of thumb regarding nodes that are unlikely to be collapsible. In one implementation, the equivalence labeler 1325 assigns labels to nodes up to a degree of 4 connectedness and not for degrees five and greater. In another implementation, labels are assigned up to a degree of 3 connectedness, for equivalence collapsing. In most graphs, nodes with higher degrees of connectedness are less likely to be collapsible. Therefore, limiting the labelling of nodes up to a degree of 4 reduces the computational resources required for this labelling process and also reduces time required to complete the labelling process.

Node Scorer

Nodes with same labels can be collapsed into an equivalence node. However, the technology disclosed identifies nodes of high interest to analyst before collapsing equivalent nodes so that nodes of high interest remain visible to the analyst, are not included in a collapse. The node scorer 1335 assigns scores to the nodes. In one implementation, the scores are assigned according to a severity level of the alert generated for the computer network entity. In one implementation, alerts are generated by the security systems, such as firewalls and antivirus, along with a score. The network-based security systems can assign scores to security events or entities related to a security event. Host-based security systems deployed on user endpoints or other computing devices can also score security events. In one implementation, the initial alert scores assigned to network entities by one or more security systems are used to determine a node score by combining it with other factors. An example of such factors is the number of neighboring nodes with edge connections. If there are fewer nodes in the neighborhood of the node being scored, then a high score can be assigned to the node so that the node is not collapsed into an equivalent node. This represents a scenario in which the node being scored is located in a part of the graph which is already sparse. In one implementation, the scores assigned by the security systems are related to a connection between two entities in the computer network. For example, consider an "action" type connection between a user endpoint and a server when user endpoint is attempting to authenticate to a host. Now consider this user endpoint is comprised as an attacker has gained access to it and the attacker is attempting to authenticate to the server without valid credentials. This results in a spike in authentication action from the compromised user endpoint which is observed by the security system. The connection between the user endpoint and the host is then labeled as an alert. The node (representing user endpoint) is connected to an edge (representing authentication action) that is labeled as an alert and therefore, the node is given a high score.

Threshold Adjuster

The technology disclosed avoids hiding nodes of high interest in the graph by comparing the scores of the nodes with a threshold. The threshold adjuster 1345 sets a value of the threshold which is compared with node scores to exclude hiding nodes of high interest. The nodes having scores above the threshold are not collapsed into equivalence nodes. The technology disclosed can aggregate the nodes less aggressively by setting a low value of the threshold. This results in a higher number of nodes avoiding collapsing into equivalence nodes. Thus displaying more detail to the analyst in the graph. On the other hand, the technology disclosed can also aggregate more aggressively by setting a high value of the threshold. This results in collapsing of more nodes that have scores lower than the set threshold and results in displaying less detail in the graph because only nodes with high scores that are above the set threshold avoid collapsing into equivalence nodes.

Node Pinner and Node Aggregator

The node pinner 1355 marks a node as "do not collapse". The nodes that are pinned are not collapsed in equivalence collapsing. Nodes that are important for a particular analysis carried out by the security analyst can be pinned. The node aggregator 1365 traverses through the graph and aggregates nodes with matching labels that belong to the same equivalence group provided their score is below the threshold set by the threshold adjuster. The nodes in each group are then replaced with corresponding equivalence nodes.

System Components—Chain Collapser

Figure 14:
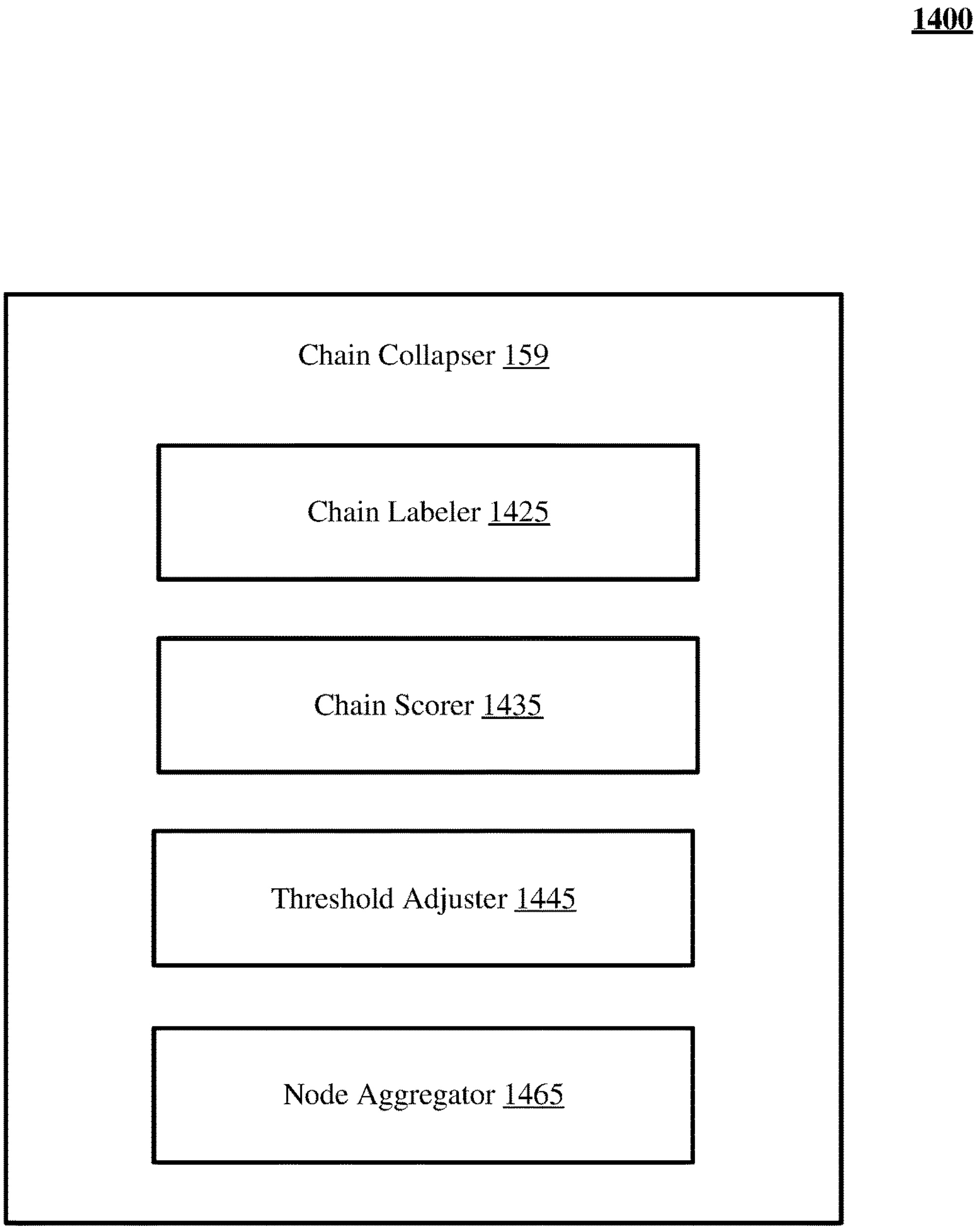
FIG. 14 is a block diagram of example components of the chain collapser of FIG. 1.

FIG. 14 is a high-level block diagram 1400 illustrating subsystem components of the chain collapser 159. The subsystems include a chain labeler 1425, a chain scorer 1435, a threshold adjuster 1445, and a node aggregator 1465. These subsystems are computer implemented using a variety of different computer systems as presented below in description of FIG. 19. The illustrated subsystem components can be merged or further separated, when implemented. The features of the subsystems are described in the following paragraphs.

Chain Labeler and Chain Collapser

The chain collapser 159 implements the second of the two collapsing methods proposed by the technology disclosed. Chain collapsing focuses on collapsing graph structures that are in the form of chains of nodes. Equivalence collapsing does not simplify chains of nodes as all nodes in the chain are not connected to a matching node. The chain labeler 1425 assigns labels to nodes such that all nodes in a chain have the same label. Chain collapsing is applied to simple chains and chains with branches are not considered. The technology disclosed applies chain collapsing to two slightly different cases of chain structures. The first type of chain structure, also referred to as a whisker chain, ends in a leaf node with degree one. The second type of chain is connected at both ends to two other nodes which means that all nodes in the chain have a degree of 2. The technology disclosed can also collapse chains that are variation of the second case in which the starting and the ending nodes are the same. This type of chain is in the form of a loop, with all nodes in the chain having a degree of two and the starting/ending node have a degree greater than two.

The chain labeler 1425 traverses the graph and labels nodes in a chain. In one implementation, to label nodes connected in a chain structure, the chain labeler finds a node with a degree of 2 with a first adjacent node having a degree of 2 and a second adjacent node with degree not equal to 2. The second adjacent node is the end node of the chain structure. If the chain is in the form of a whisker, the second adjacent node has a degree of 1 otherwise, the second adjacent node has a degree equal to or greater than 3. The chain labeler then traverses the nodes in the chain and assigns labels to the nodes, until it reaches a node with a degree equal to or greater than 3 which is the other end of the chain. The chain scorer 1435 scores the chains. In one implementation, the scores are calculated using the number of nodes in the chains.

Threshold Adjuster and Node Aggregator

The threshold adjuster 1455 sets a value of a threshold with which scores of chains are compared before collapsing the chains into single representative chain-collapsed nodes. The node aggregator 1465 collapses nodes in chains to chain-collapsed nodes if the score of the chain is less than the threshold. This allows chains of unusual length excluded from collapsing and being visible to the security analyst. In the following paragraphs, examples of simplification of graph structures using equivalence and chain collapsing, without hiding nodes of high interest, are presented.

Example of Equivalence Collapsing

Figure 15:
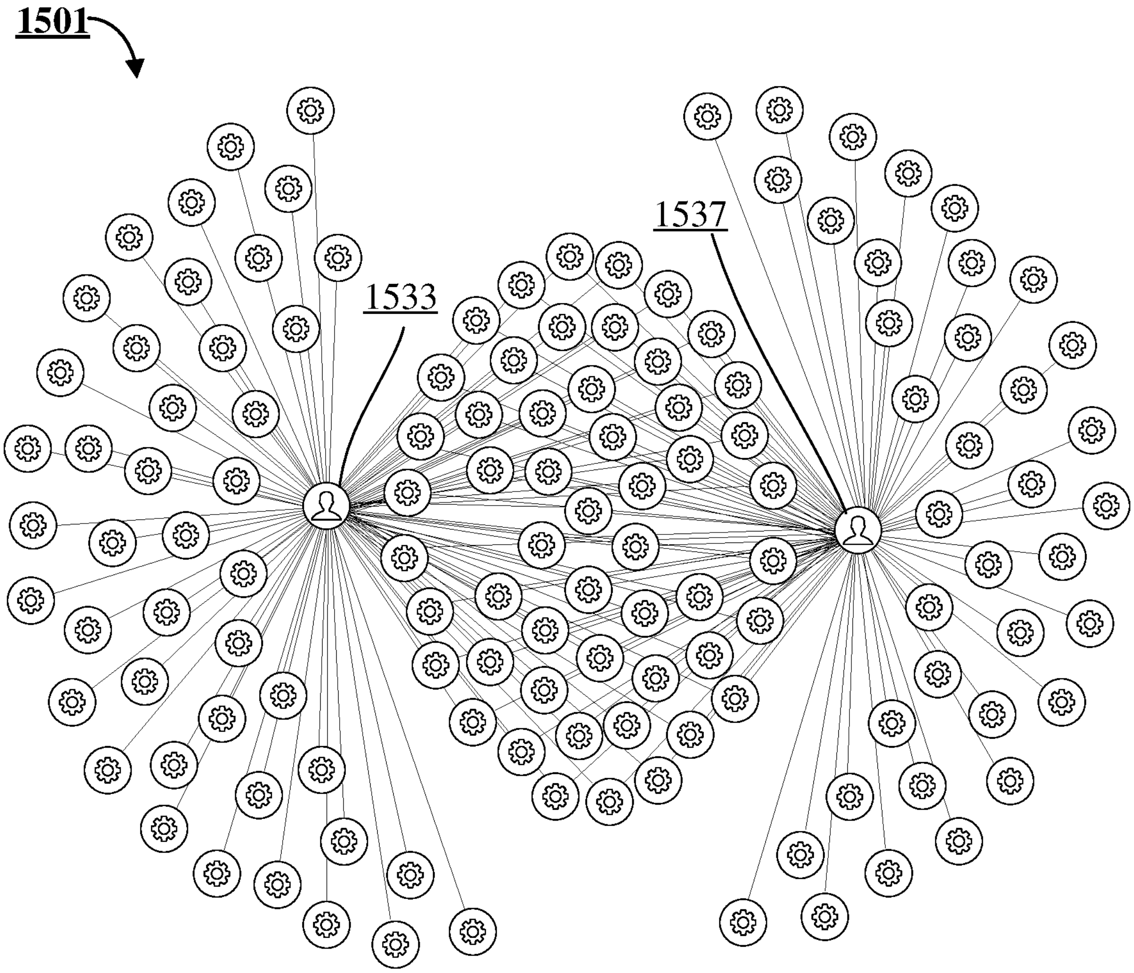
FIG. 15 is an example of reducing clutter during graph presentation by applying equivalence collapsing to a graph representing users connected to processes in a computer network.
Figure 15:
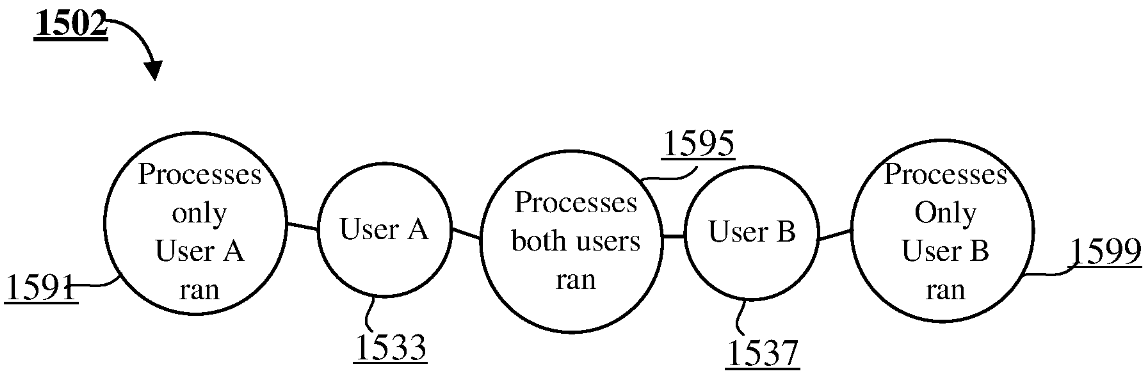

FIG. 15 presents an example in which two types of entities are represented in a graph of a computer network. This is a simple example in which two users A and B start many processes. The nodes on left side in a graph 1501 represent processes that are started by user A 1533 while nodes on the right side of graph 1501 represent processes started by user B 1537. The nodes in the middle of graph 1501 represent processes that are shared by both users A and B. Equivalence collapsing method to simplify the structure of graph 1501 results in a graph 1502. The nodes on the left of graph 1501 are equivalent and are collapsed to an equivalence node 1591 and which is connected to the node 1533 representing user A in the graph 1501. Similarly, nodes on the right side of the graph 1501 are collapsed to an equivalence node 1599 which is then connected to the node 1537 representing user B in the graph 1502. The nodes in the middle of the graph are collapsed to an equivalence node 1595 which is connected to both of the nodes 1533 and 1537 representing the user A and the user B respectively. It can be seen from this simple example that the graph 1501 which is overwhelming to an analyst is simplified after application of equivalence collapsing. The illustration of equivalence collapsing in FIG. 15, however, does not include scoring of nodes so that nodes of high interest are not collapsed. The illustrations in FIGS. 16A, 16B, and 16C present a series of examples in which node scores are compared with a threshold to determine nodes of high interest that are not collapsed in equivalence nodes.

Figure 16A:
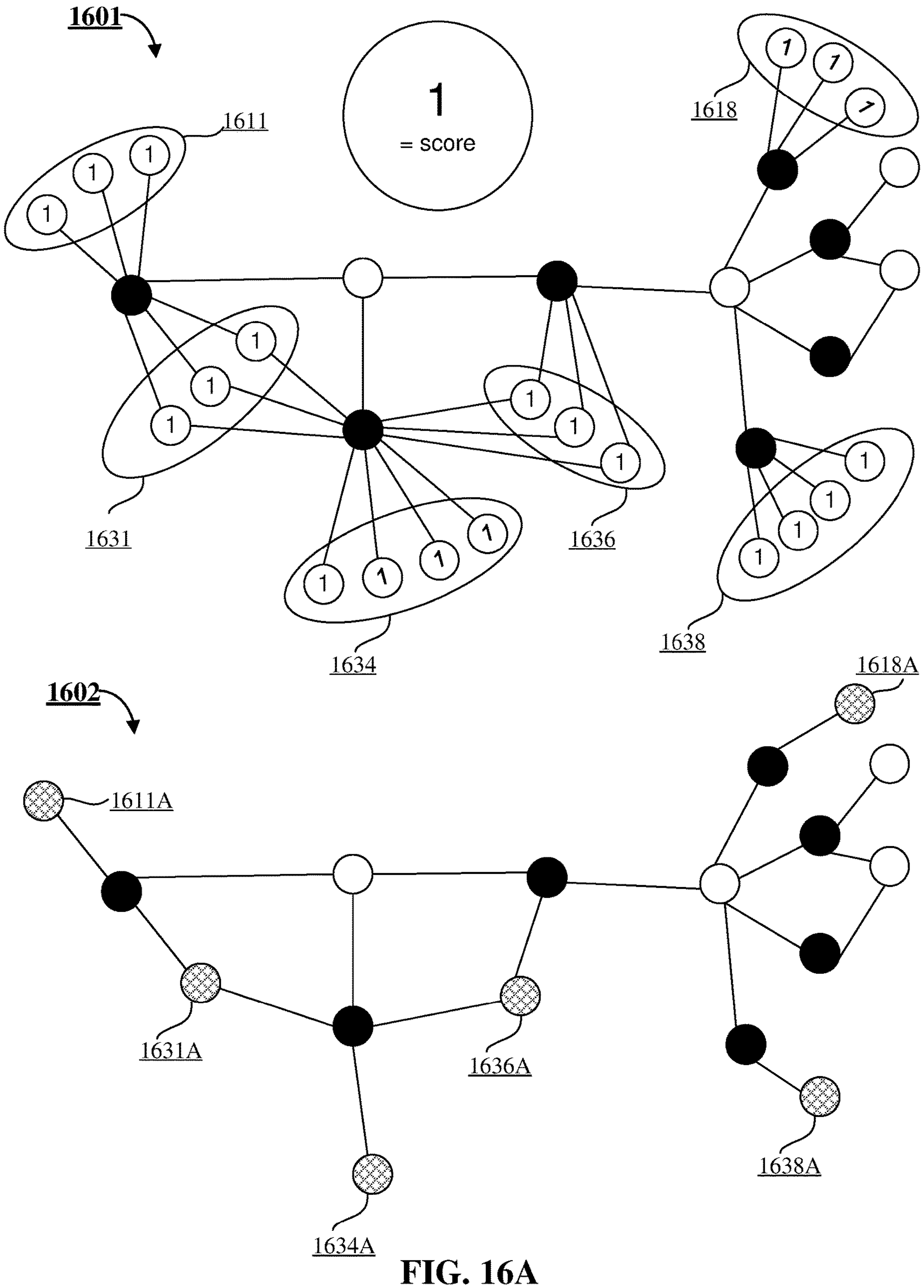
FIG. 16A illustrates equivalence collapsing by aggregating nodes in a graph by using scores assigned to the nodes.

FIG. 16A presents a graph 1601 representing entities in a computer network. The equivalent nodes are labeled in groups 1611, 1618, 1631, 1634, 1636, and 1638. Nodes in each of the labeled groups fulfills the conditions of equivalence labeling method, i.e., all of the nodes in a same equivalent group have the same degree of connectedness, they are connected to matching nodes through matching edges. The nodes can represent different entities in a computer network such as user endpoints, servers, processes, etc. In one implementation, nodes in the graph can be shaded to represent different types of entities. For example, in the graph two types of entities in the computer network are represented by solid black and white colored nodes. A number written inside a node in an equivalence group represents the node's score. Scores are assigned to the nodes representing a threat level associated with the node as described above. In the graph 1601, all nodes in equivalence groups have the same score of 1. Now consider the threshold for collapsing nodes in equivalence groups is set at a value of 2. After equivalence collapsing is applied, a graph 1602, illustrates groups of equivalent nodes 1611, 1618, 1631, 1634, 1636, and 1638 replaced with single representative equivalence nodes 1611A, 1618A, 1631A, 1634A, 1636A, and 1638A, respectively. The equivalence nodes are shown in the graphs with a hatch pattern to distinguish from other nodes.

Figure 16B:
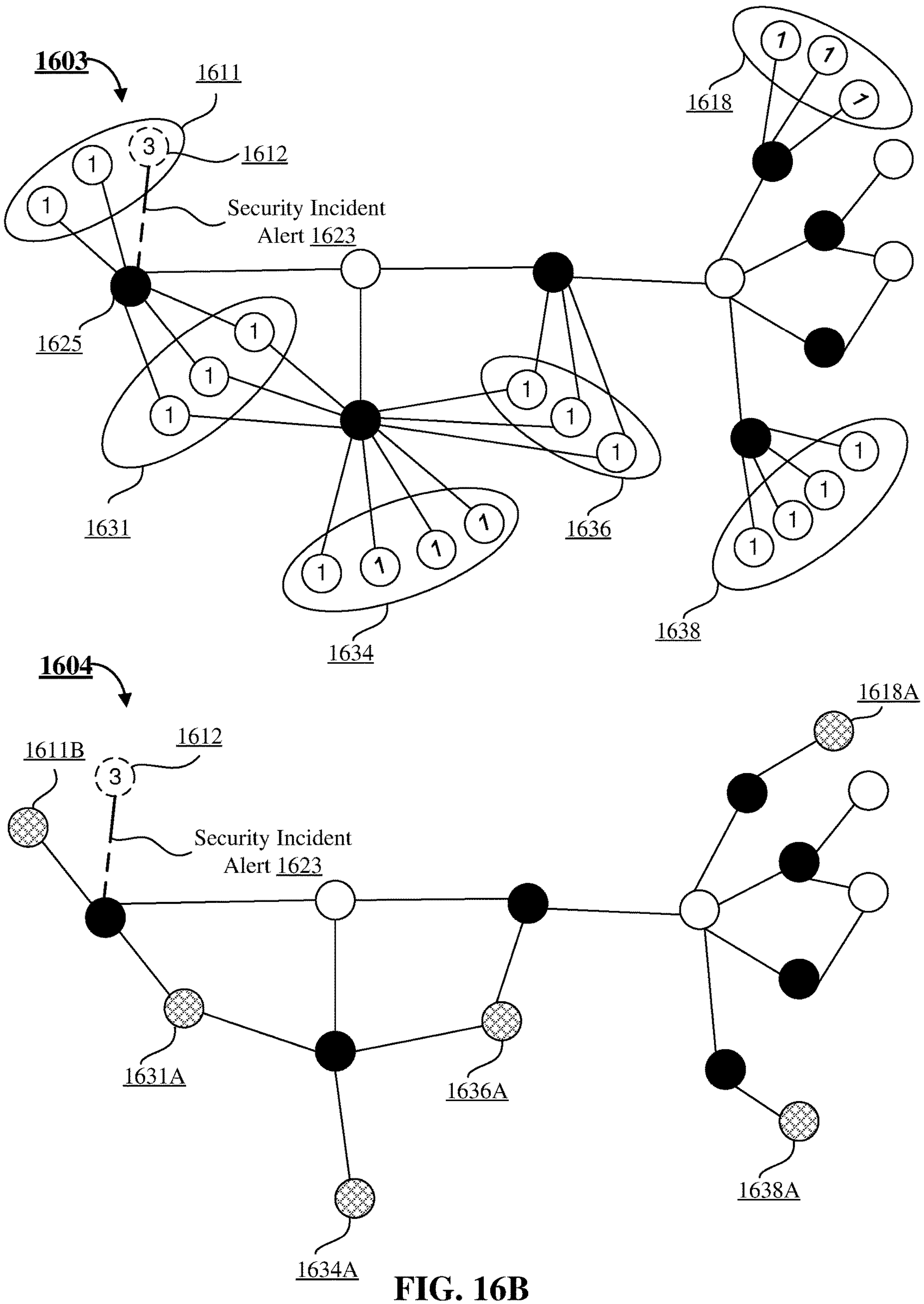
FIG. 16B illustrates preventing aggregation of a node in equivalence collapsing when the score of the node is increased due to a connected edge representing a security incident alert.

FIG. 16B presents a second example using a graph of computer network entities which has similar structure to the graph 1601. However, in this example, a node 1612 has a higher score of 3 than other nodes in the same group 1611 of equivalent nodes. The reason for high score of node 1612 is a security alert incident associated with the node and represented by a label of edge 1623 that connects the node 1612 to node 1625. This alert can be received from the logs of one of the security systems deployed to protect the enterprise network and can represent an anomaly detected by the security system. For example, if node 1612 represents a user endpoint and node 1625 represents a server, the alert label for edge 1623 can be generated because of unusual number of authentication failures. This can potentially require a "threat hunting" analysis to determine if an attacker has gained access to the user endpoint. Therefore, this node requires attention of the security analyst. The edge with alert label is shown with a broken line pattern to differentiate it from other edges. Now consider the threshold is set at a value of 2 as before. A graph 1604 shows equivalence collapsed nodes for respective groups of equivalent nodes in the graph 1603. As the score of node 1612 is greater than the threshold value, it is not collapsed to an equivalent node 1611B along with other nodes in the same group 1611.

Figure 16C:
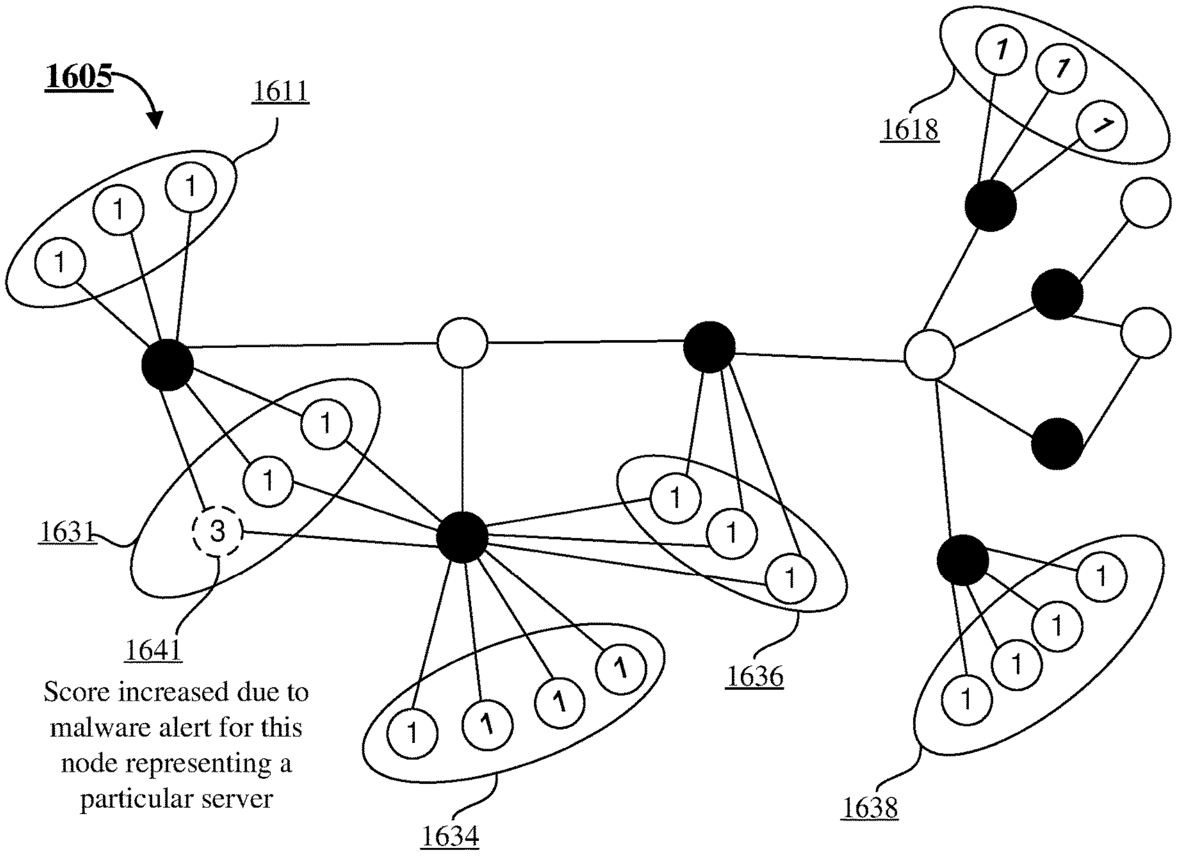
FIG. 16C illustrates preventing aggregation of a node in equivalence collapsing when the score of the node is increased due to security incident alert associated with the node.
Figure 16C:
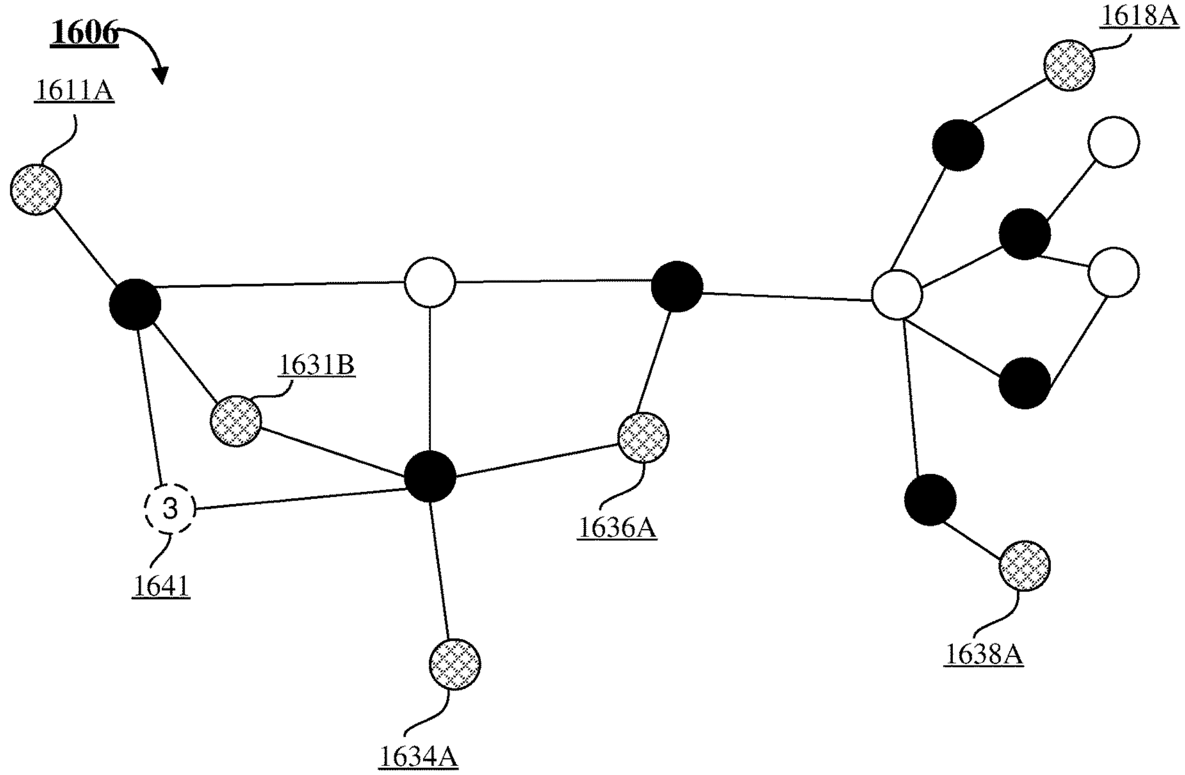

FIG. 16C illustrates another scenario in which the score of a node in an equivalence group is increased. This is an example in which the security analyst performs incident response type of analysis. Note that in this scenario, the alert is not generated because of anomalous communication between two entities as illustrated in FIG. 16B. A node 1641 in a graph 1605 is scored higher than other nodes in the group 1631 of equivalent nodes because of a malware detected in the entity represented by the node 1641. The node 1641 can represent a user endpoint on which a user has downloaded a file that contained a malware. As shown in a graph 1606, the node 1641 is not collapsed in an equivalence collapsed node 1631B in which the other equivalent nodes belonging to the group 1631 are collapsed. This is because the score of node 1641 is above the threshold value of 2.

Example of Chain Collapsing

The second type of collapsing method proposed by the technology disclosed applies to nodes connected in a chain.

Figure 17A:
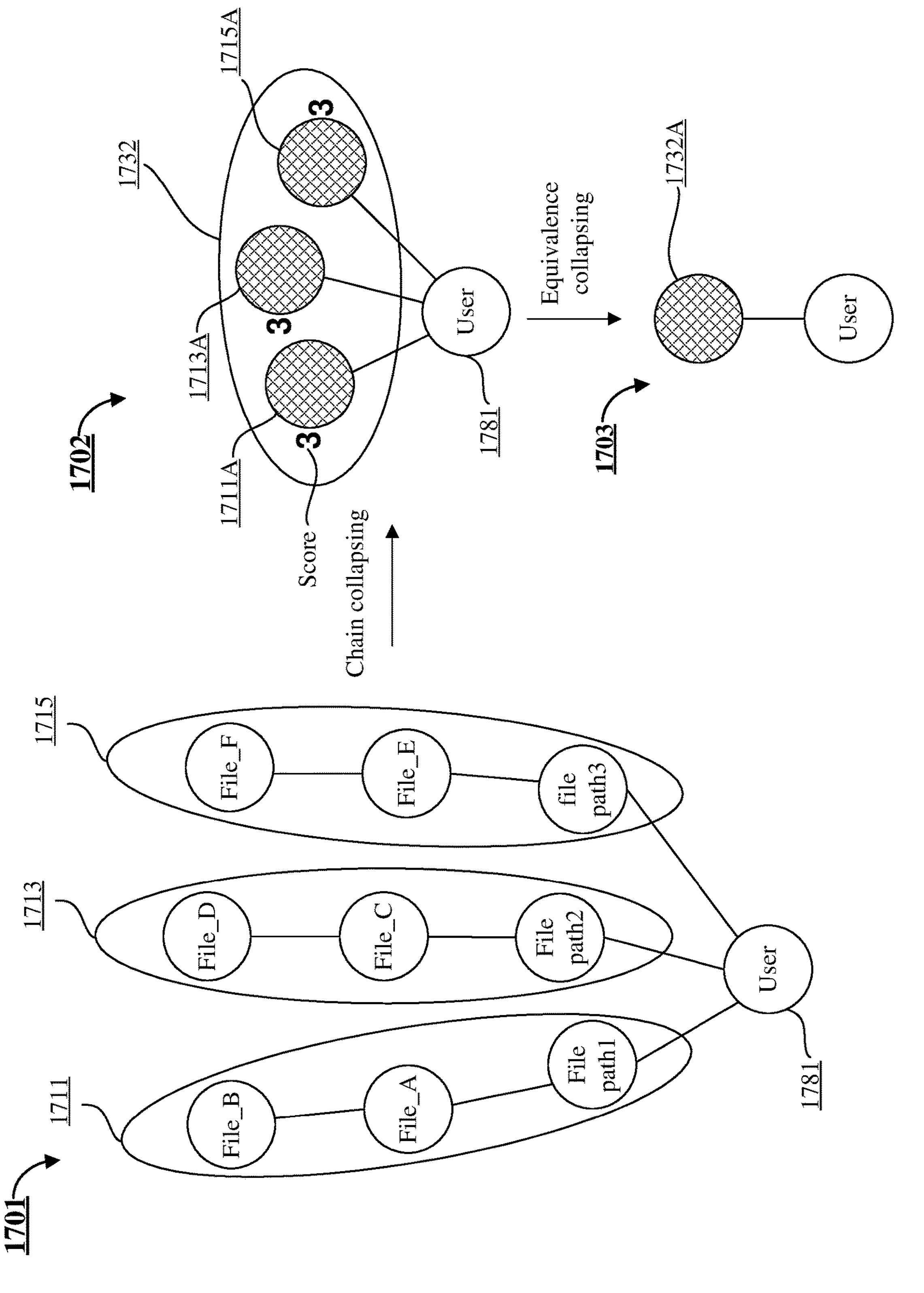
FIG. 17A is an illustration of chain collapsing of whisker chains followed by equivalence collapsing.
Figure 17B:
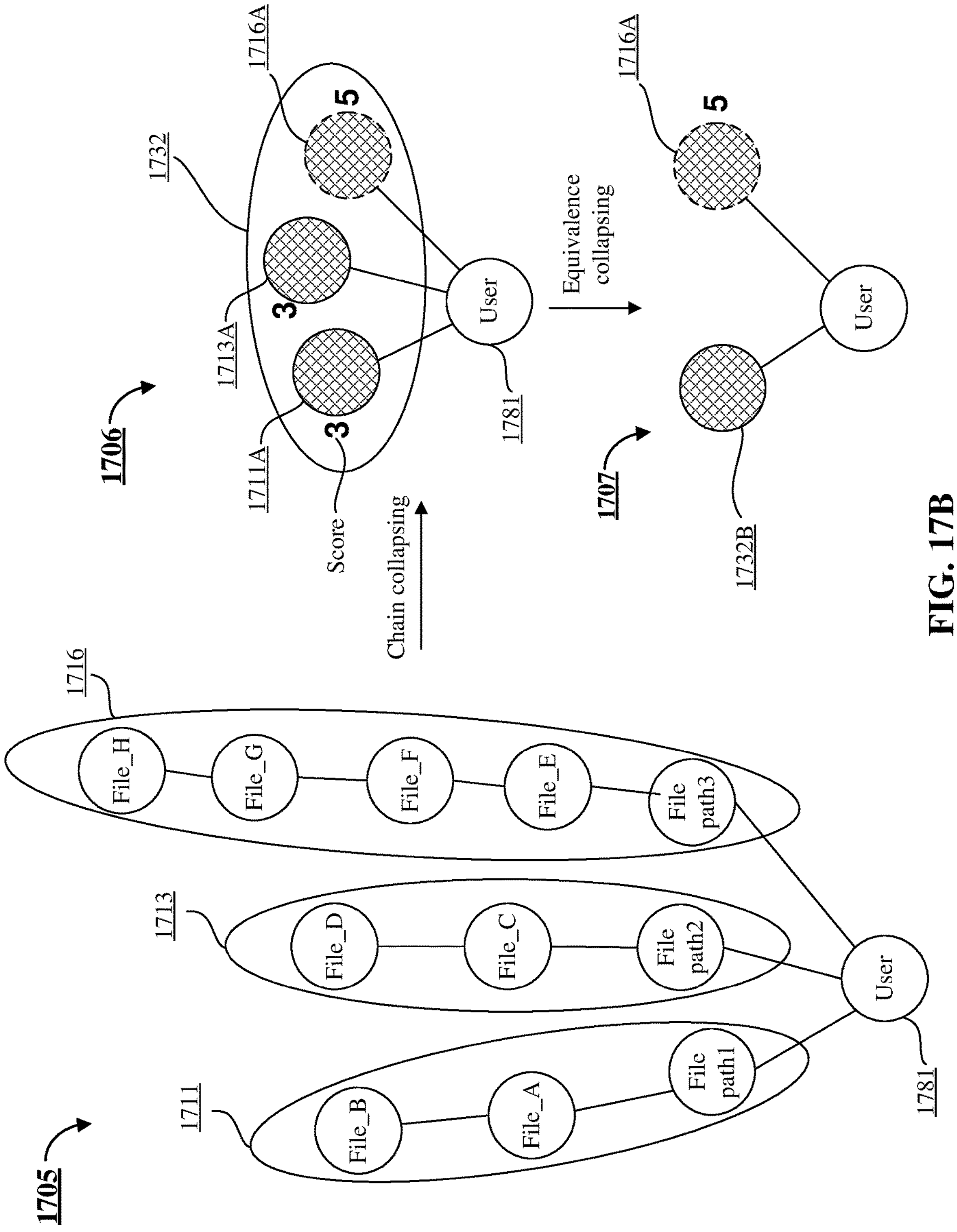
FIG. 17B illustrates chain collapsing of whisker chains and using scores of chain-collapsed single nodes to prevent aggregation of a node.

The application of this method is presented in FIGS. 17A and 17B. A graph 1701 illustrates a graph consisting of three chains of nodes 1711, 1713, and 1715. This is an example of a user that executes three processes, each connected to a file which is again connected to a second file. The user is represented by a node 1781 in the graph 1701. The equivalence collapsing method presented above will not simplify the structure of this graph. The technology disclosed proposes a second collapsing method referred to as chain collapsing in which chains of nodes 1711, 1713, and 1715 can be collapsed into a single representative chain-collapsed node. The graph 1701 presents a first case of chain collapsing in which whisker chains are collapsed. The whisker chains end in leaf nodes. All nodes in whisker chains have a degree of two except the leaf nodes which have a degree of 1.

The chains are scored before they are collapsed using chain collapsing method. This is to identify unusually long chains that may represent an anomaly and therefore need to be excluded from collapsing. In one implementation, the chains are scores based on the number of nodes connected in the chain. The three whisker chains 1711, 1713, and 1715 all have three nodes each and therefore, each has a score of 3. The scores are compared with a threshold to determine if the chain is excluded from collapsing. Consider the threshold is set at 10, which results in the three whisker chains 1711, 1713, and 1715 collapsed to respective chain-collapsed nodes 1711A, 1713A, and 1715A shown in a graph 1702. The chain-collapsed nodes are shown with a hatch pattern to differentiate with other nodes in the graph. The scores for chain-collapsed node are presented besides respective chain-collapsed nodes. In this example, each of the three chains has a score of 3. Chain collapsing simplifies the structure of the graph 1701 to the graph 1702.

Chain-collapsed nodes can be further equivalence collapsed as shown in FIG. 17A. The chain-collapsed nodes 1711A, 1713A, and 1715A have matching degrees, are connected to the same user node 1781 and are connected by the same type of edges. Therefore, they fulfill the requirements of equivalence collapsing. However, the technology disclosed considers another factor for equivalence collapsing of chain-collapsed nodes, which is the length of the chains collapsed into the chain-collapsed nodes. Since all chain-collapsed nodes in equivalence group 1732 have a score of 3 as shown besides each chain-collapsed node, the technology disclosed collapses the three chain-collapsed nodes into a single equivalence node 1732A as shown in a graph 1703.

FIG. 17B presents a scenario in which chain collapsing is applied to whisker chains connected to a same node but having chains of different length. Three chains 1711, 1713 and 1716, illustrated in a graph 1705, are connected to the user node 1781. The chains 1711 and 1713 each have a length 3. The chain 1716 has five nodes connected in the chain and therefore its length is 5. Chain collapsing method is applied to the three chains and results in three chain-collapsed nodes 1711A, 1713B, and 1716A as shown in a graph 1706. The chain-collapsed nodes 1711A and 1713A each have a score of 3. The chain-collapsed node 1716A has a score of 5 as shown in the graph 1706. To differentiate the chain-collapsed node 1716A from other chain-collapsed nodes in equivalence group 1732 in the graph 1706, the node 1716A is drawn with a broken line. The chain collapsing is followed by equivalence collapsing. As the score of the chain-collapsed node 1716A is different than the score of chain-collapsed nodes 1711A and 1713A, the chain-collapsed node 1716A is not collapsed to equivalence node 1732B in a graph 1707 and remains visible as node 1716A.

Figure 18A:
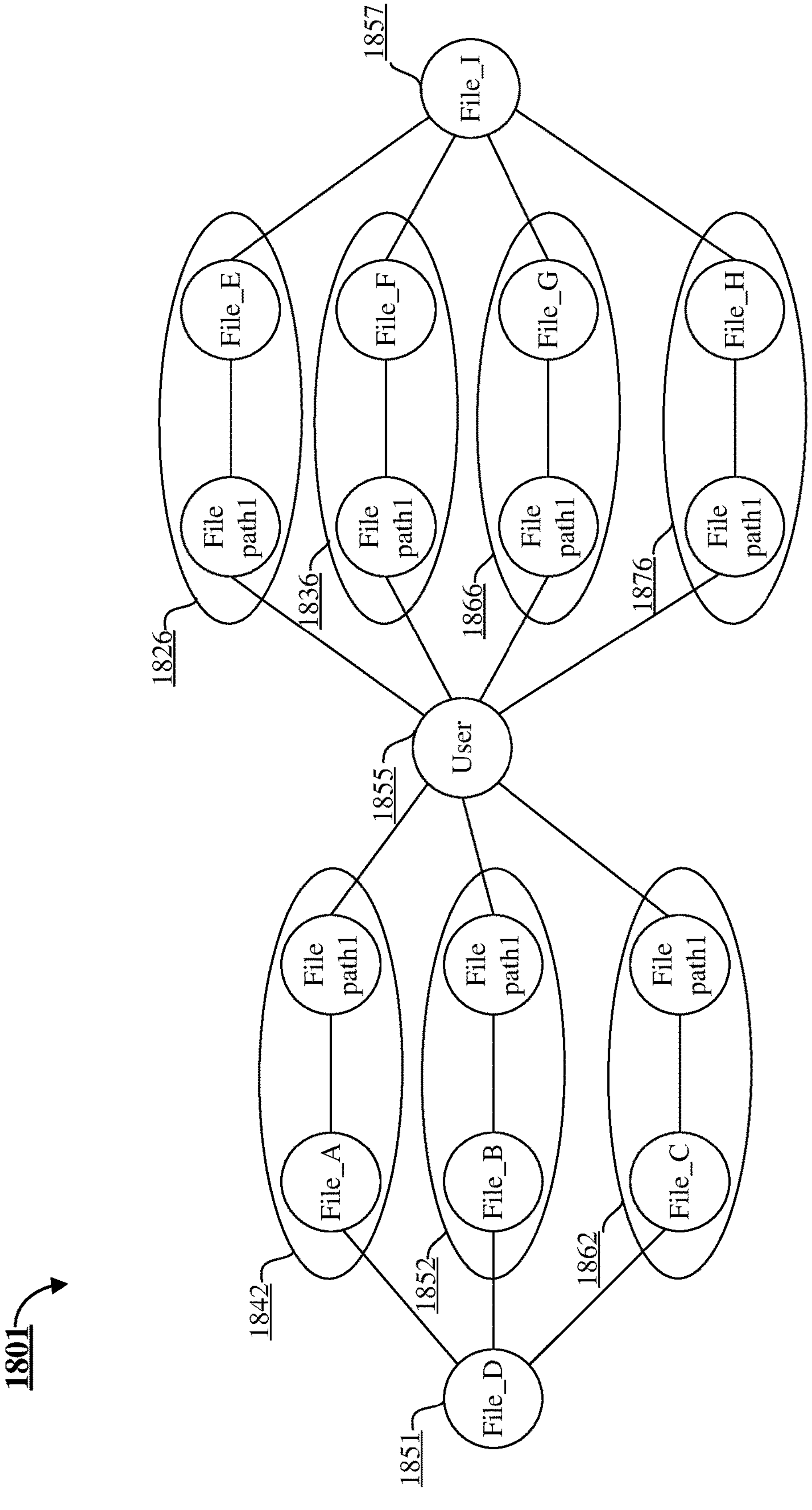
FIG. 18A is an example graph illustrating chains connected to same nodes on both ends.
Figure 18B:
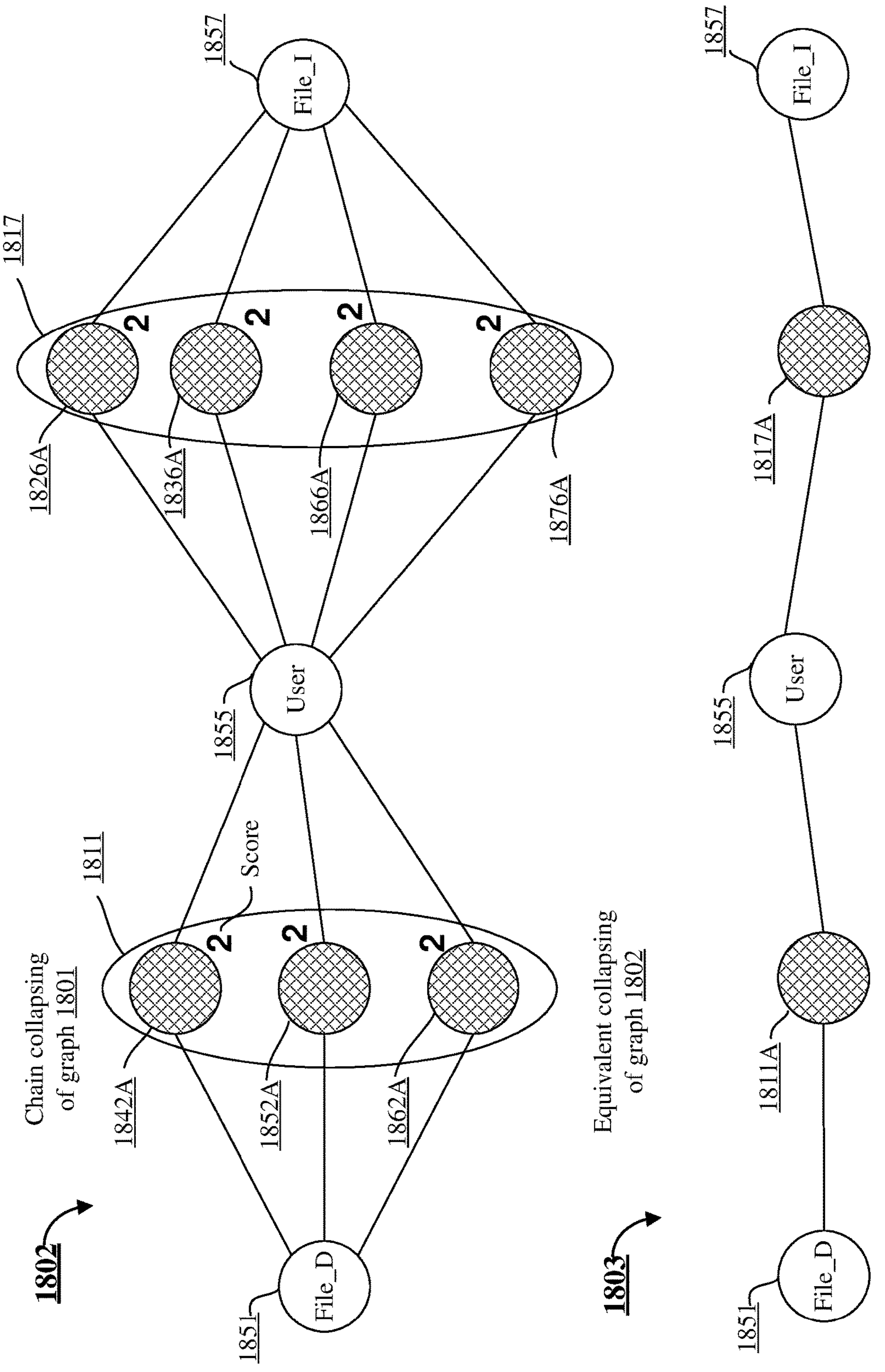
FIG. 18B illustrates chain collapsing of chains in the example graph of FIG. 18A followed by equivalent collapsing of chain-collapsed nodes.

In the following example, chain collapsing method is applied to a second type of chains which are connected to nodes on both ends. FIG. 18A presents a graph representing a computer network in which a user 1855 starts seven processes, each connected a file. Three chains 1842, 1852, and 1862 on the left side of the user node 1855 in graph 1801 are connected the same node 1851 while four chains 1826, 1836, 1866, and 1876 on the right side of the user node 1855 are connected to a node 1857. All nodes in the chains in graph 1802 have a degree of 2 as there are no leaf nodes. Equivalence collapsing does not simplify the graph 1802, however application of chain collapsing to graph 1801 results in a graph 1802 as shown in FIG. 18B.

The seven chains in graph 1802 are collapsed to chain-collapsed nodes 1842A, 1852A, 1862A, 1826A, 1836A, 1866A and 1876A respectively. The scores of chain-collapsed nodes are also shown besides respective chain-collapsed nodes. All chain-collapsed nodes have a score of 2 as they have two nodes in respective chains. Following chain collapsing, equivalence collapsing is applied to the graph 1802 to further simplify the graph. Two groups 1811 and 1817 of equivalent nodes are identified. Resulting graph 1803 shows equivalence nodes 1811A and 1817A.

Computer System

Figure 19:
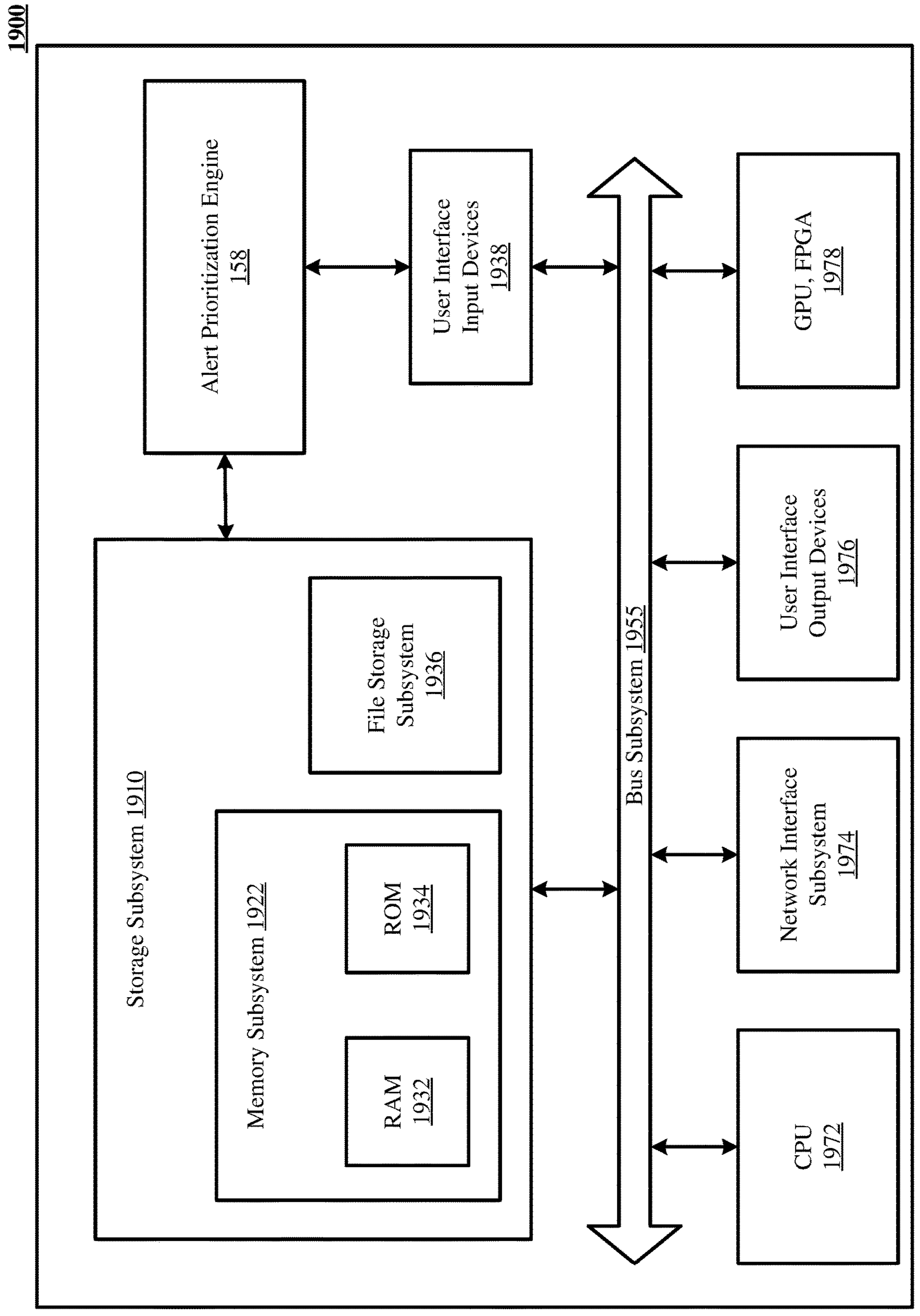
FIG. 19 is a simplified block diagram of a computer system that can be used to implement the technology disclosed.

FIG. 19 is a simplified block diagram of a computer system 1900 that can be used to implement alert prioritization engine 158 of FIG. 1 to group security alerts in generated in a computer network and prioritize grouped security alerts. In another implementation, computer system 1900 can be used to implement equivalence collapser 149 of FIG. 1 (not shown) to simplify graph structures for the security analyst by employing the node collapsing technique described with reference to FIG. 13. In yet another implementation, computer system 1900 can be used to implement chain collapser 159 of FIG. 1 (not shown) to simplify graph structures for the security analyst by employing the node collapsing technique described with reference to FIG. 14. The equivalence collapse 149 and chain collapser 159 of FIG. 1 are intentionally omitted to improve the clarity of FIG. 19; however, it is to be understood that the description of computer system 1900 below can similarly apply to other elements of the disclosed system. Computer system 1900 includes at least one central processing unit (CPU) 1972 that communicates with a number of peripheral devices via bus subsystem 1955. These peripheral devices can include a storage subsystem 1910 including, for example, memory devices and a file storage subsystem 1936, user interface input devices 1938, user interface output devices 1976, and a network interface subsystem 1974. The input and output devices allow user interaction with computer system 1900. Network interface subsystem 1974 provides an interface to outside networks, including an interface to corresponding interface devices in other computer systems.

In one implementation, the alert prioritization engine 158 of FIG. 1 is communicably linked to the storage subsystem 1910 and the user interface input devices 1938.

User interface input devices 1938 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term “input device” is intended to include all possible types of devices and ways to input information into computer system 1900.

User interface output devices 1976 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1900 to the user or to another machine or computer system.

Storage subsystem 1910 stores programming and data constructs that provide the functionality of some or all of the modules and methods described herein. Subsystem 1978 can be graphics processing units (GPUs) or field-programmable gate arrays (FPGAs).

Memory subsystem 1922 used in the storage subsystem 1910 can include a number of memories including a main random access memory (RAM) 1932 for storage of instructions and data during program execution and a read only memory (ROM) 1934 in which fixed instructions are stored. A file storage subsystem 1936 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1936 in the storage subsystem 1910, or in other machines accessible by the processor.

Bus subsystem 1955 provides a mechanism for letting the various components and subsystems of computer system 1900 communicate with each other as intended. Although bus subsystem 1955 is shown schematically as a single bus, alternative implementations of the bus subsystem can use multiple busses.

Computer system 1900 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1900 depicted in FIG. 19 is intended only as a specific example for purposes of illustrating the preferred embodiments of the present invention. Many other configurations of computer system 1900 are possible having more or less components than the computer system depicted in FIG. 19.

Particular Implementations

Alert Prioritization

The technology disclosed relates to grouping security alerts generated in a computer network and prioritizing grouped security alerts for analysis.

The technology disclosed can be practiced as a system, method, device, product, computer readable media, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A system implementation of the technology disclosed includes one or more processors coupled to memory. The memory is loaded with computer instructions to group security alerts generated from a computer network and prioritize grouped security alerts for analysis. The system graphs entities in the computer network as nodes connected by one or more edges. The system assigns a connection type to each edge. The connection type represents a relationship type between the nodes connected by the edge. The system assigns a weight to each edge representing a relationship strength between the nodes connected. The system assigns native scores from the security alerts to the nodes or to edges between the nodes. The system includes logic to traverse the graph, starting at the starting nodes with non-zero native scores, visiting the nodes in the graph and propagating the native scores from the starting nodes attenuated by the weights assigned to an edge traversed. The traversing extends for at least a predetermined span from the starting nodes, through and to neighboring nodes connected by the edges. The system normalizes and accumulates propagated scores at visited nodes, summed with the native score assigned to the visited nodes to generate aggregate scores for the visited nodes. The normalizing of the propagated scores at the visited nodes includes attenuating a propagated score based on a number of contributing neighboring nodes of a respective visited node to form a normalized score. The system forms clusters of connected nodes in the graph that have a respective aggregate score above a selected threshold. The clusters are separated from other clusters through nodes that have a respective aggregate score below the selected threshold. Finally, the system ranks and prioritizes clusters for analysis according to the aggregate scores of the nodes in the formed clusters.

The system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The nodes in the graph representing entities in the computer network can be connected by one or more directed edges. The nodes the graph can also be connected by directed and bi-directed or undirected edges.

The system includes logic to assign native alert scores for pending alerts to edges between the nodes. The system includes logic to distribute native alert scores from edges to nodes connected to the edges. The edges can include a loop edge connected to a single node. In this case, the system assigns the native alert score from a loop edge to the single node connected to the edge. The connection type assigned to edges can include an association connection type, a communication connection type, a failure connection type, a location connection type, and an action or an operation connection type.

When traversing the graph from the starting node to propagate native alert scores, the predetermined span is up to five edge or node hops from the starting node.

The system propagation of native scores from the starting nodes, through and to neighboring nodes connected by the edges is limited to when the propagated score is above a selected threshold and stops when the propagated score is below the selected threshold.

When normalizing the propagated score at the visited node, the system includes logic to attenuate the propagated score at the visited node in proportion to the number of neighboring nodes connected to the visited node by edges of the same connection type.

The system includes logic to attenuate the propagated score at the visited node by dividing the propagated score by a sum of weights of relationship strengths on edges connected to the visited node.

When forming clusters of connected nodes, the system includes logic to separate clusters by at least one node that has an aggregate score below a selected threshold. In another implementation, the system includes logic to separate clusters of connected nodes by at least one node in a pair of connected nodes that has an aggregate score less than ten times the aggregate score of the other node in the pair of connected nodes. In other implementations, higher values of the threshold can be used. For example, the system can include logic to separate clusters of connected nodes by at least one node in a pair of connected nodes that has an aggregate score less than fifteen times, twenty times or twenty five times the aggregate score of the other node in the pair of connected nodes. Similarly, in other implementations, lower values of threshold can be used. For example, the system can include logic to separate clusters of connected nodes by at least one node in a pair of connected nodes that has an aggregate score less than five times, three times or two times the aggregate score of the other node in the pair of connected nodes.

Other implementations may include a non-transitory computer readable storage medium storing instructions executable by a processor to perform functions of the system described above. Yet another implementation may include a method performing the functions of the system described above.

A method implementation of the technology disclosed includes graphing entities in the computer network as nodes connected by one or more edges. The method includes assigning a connection type to each edge. The connection type represents a relationship type between the nodes connected by the edge. The method includes, assigning a weight to each edge representing a relationship strength between the nodes connected. The method includes assigning native scores from the security alerts to the nodes or to edges between the nodes. The method includes traversing the graph, starting at the starting nodes with non-zero native scores, visiting the nodes in the graph and propagating the native scores from the starting nodes attenuated by the weights assigned to an edge traversed. The traversing extends for at least a predetermined span from the starting nodes, through and to neighboring nodes connected by the edges. The method includes normalizing and accumulating propagated scores at visited nodes, summed with the native score assigned to the visited nodes to generate aggregate scores for the visited nodes. The normalizing of the propagated scores at the visited nodes includes attenuating a propagated score based on a number of contributing neighboring nodes of a respective visited node to form a normalized score. The method includes forming clusters of connected nodes in the graph that have a respective aggregate score above a selected threshold. The clusters are separated from other clusters through nodes that have a respective aggregate score below the selected threshold. Finally, the method includes ranking and prioritizing clusters for analysis according to the aggregate scores of the nodes in the formed clusters.

Each of the features discussed in this particular implementation section for the system implementation apply equally to this method implementation. As indicated above, all the system features are not repeated here and should be considered repeated by reference.

Other implementations may include a non-transitory computer readable storage medium storing instructions executable by a processor to perform the method described above. Yet another implementation may include a system including memory and one or more processors operable to execute instructions, stored in the memory, to perform the method described above.

Computer readable media (CRM) implementations of the technology disclosed include a non-transitory computer readable storage medium impressed with computer program instructions, when executed on a processor, implement the method described above.

Each of the features discussed in this particular implementation section for the system implementation apply equally to the CRM implementation. As indicated above, all the system features are not repeated here and should be considered repeated by reference.

Equivalence Collapsing

The technology disclosed relates to clutter reduction during graph presentation for security incident analysis.

The technology disclosed can be practiced as a system, method, device, product, computer readable media, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A system implementation of the technology disclosed includes one or more processors coupled to memory. The memory is loaded with computer instructions to reduce clutter during graph presentation for security incident analysis of a computer network. The system scores nodes that are of indicated interest for security incident analysis and potentially collapsed by equivalence. The system aggregates and hides equivalent nodes that have matching degrees. The equivalent nodes are connected to matching nodes by matching edge types, and have scores below a first selected threshold. The system leaves interesting nodes having scores above the first selected threshold visible.

The system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The nodes in the graph of the computer network can represent network resources in the computer network.

The score for a particular node is increased when the particular node is connected to an edge representing a security incident alert.

During a threat hunting alert analysis, the system increases score for a particular node when the node represents a user entity type. The threat hunting analysis includes displaying nodes, representing users in a computer network, to a security analyst as potential threats.

During malware response alert analysis, the system increases the score for a particular node when the node represents a server type entity.

In response to receiving a node pinning message for a node corresponding to a particular user in a computer network for whom the threat hunting alert was generated, the system increases the score for the pinned node representing the particular user above the first selected threshold.

In response to receiving a node pinning message for a node corresponding to a particular server in a computer network for which the malware response alert was generated, the system increases the score for the pinned node representing the particular server above the first selected threshold.

Other implementations may include a non-transitory computer readable storage medium storing instructions executable by a processor to perform functions of the system described above. Yet another implementation may include a method performing the functions of the system described above.

A method implementation of the technology disclosed includes scoring nodes that are of indicated interest for security incident analysis and potentially collapsed by equivalence. The method includes aggregating and hiding equivalent nodes that have matching degrees. The equivalent nodes are connected to matching nodes by matching edge types, and have scores below a first selected threshold. The method leaves interesting nodes having scores above the first selected threshold visible.

Each of the features discussed in this particular implementation section for the system implementation apply equally to this method implementation. As indicated above, all the system features are not repeated here and should be considered repeated by reference.

Other implementations may include a non-transitory computer readable storage medium storing instructions executable by a processor to perform the first method described above. Yet another implementation may include a system including memory and one or more processors operable to execute instructions, stored in the memory, to perform the first method described above.

Computer readable media (CRM) implementations of the technology disclosed include a non-transitory computer readable storage medium impressed with computer program instructions, when executed on a processor, implement the method described above.

Each of the features discussed in this particular implementation section for the first system implementation apply equally to the CRM implementation. As indicated above, all the system features are not repeated here and should be considered repeated by reference.

Chain Collapsing

A system implementation of the technology disclosed includes one or more processors coupled to memory. The memory is loaded with computer instructions to reduce clutter during graph presentation for security incident analysis. The system identifies chains of at least three nodes having degrees of 1 or 2, without branching from any node in the chain. The system collapses the identified chains into chain-collapsed single nodes.

The system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

In one implementation, at least one of the chains is a whisker chain having at least three nodes and ending in a leaf node having a degree of 1.

The system scores a plurality of the chain-collapsed nodes that are of interest for security incident analysis for further equivalence collapsing, to prevent aggregation. The system aggregates and hides chain-collapsed nodes that are connected to matching nodes by matching edge types, and that have scores below a second selected threshold. The interesting chain-collapsed nodes having scores above the second selected threshold are left visible and not collapsed.

The system scores a particular chain-collapsed node by increasing the score of the particular chain-collapsed node when a chain length of the particular chain-collapsed node does not match chain length of chain-collapsed nodes connected to the matching nodes. The chain lengths of chain-collapsed nodes indicate number of nodes in respective chains.

Other implementations may include a non-transitory computer readable storage medium storing instructions executable by a processor to perform functions of the system described above. Yet another implementation may include a method performing the functions of the system described above.

A method implementation of the technology disclosed includes reducing clutter during graph presentation for security incident analysis. The method includes identifying chains of at least three nodes having degrees of 1 or 2, without branching from any node in the chain. The method includes collapsing the identified chains into chain-collapsed single nodes. The chain collapsed nodes can be further collapsed by applying the equivalence collapsing described above, and any or all of its features.

Each of the features discussed in this particular implementation section for the system implementation apply equally to this method implementation. As indicated above, all the system features referenced from the method are not repeated here and should be considered repeated by reference.

Other implementations may include a non-transitory computer readable storage medium storing instructions executable by a processor to perform the methods described above and any combination of associated features. Yet another implementation may include a system including memory and one or more processors operable to execute instructions, stored in the memory, to perform the methods described above and any combination of associated features. As indicated above, the referenced method features are not repeated here and should be considered repeated by reference. Computer readable media (CRM) implementations of the technology disclosed include a non-transitory computer readable storage medium impressed with computer program instructions, when executed on a processor, implement the method described above.

Each of the features discussed in this particular implementation section for the system implementation apply equally to the CRM implementation. As indicated above, all the system features are not repeated here and should be considered repeated by reference.

What is claimed is:

1. A computer-implemented method of clutter reduction with exclusions from collapsing in a graph representing network resources in a computer network with security analysis-related scores overlaid on the graph, including:

aggregating by equivalence, and simplifying into an aggregate-node adapted to display at least first and second equivalent chains of nodes, without branches, that have the same length nodes, that have the same edge types connecting the nodes, and that are connected at opposing ends to shared first and second endpoint nodes;

excluding from the aggregating at least one third equivalent chain of nodes that are connected to the first and second endpoint nodes, based on an accumulated score across the nodes in the at least one third equivalent chain, wherein the accumulated score exceeds a threat threshold;

causing display, to a security analyst, of at least a portion of the graph with nodes and edges that include the first and second endpoint nodes, the aggregate-node, the at least one third equivalent chain, and edges that connect the nodes, wherein at least one node represents a server entity type;

receiving a node pinning message for a pinned node corresponding to a particular server entity as potentially compromised by malware; and updating a score for the pinned node representing the particular server entity to a score value that excludes the pinned node from the aggregating by equivalence.

2. The method of claim 1, further including assigning native scores for pending alerts to at least one of the edges between the nodes.

3. The method of claim 2, further including distributing the assigned native scores from the edges to nodes connected to the edges.

4. The method of claim 1, wherein:

the chains of connected nodes are separated by at least a pair of connected nodes;

an aggregate score ratio, the ratio including the aggregate score of the higher scoring node over the aggregate score of the lower scoring node, exceeds a ratio threshold; and the ratio threshold falls in a range between two and twenty-five.

5. The method of claim 1, wherein the security analysis is a threat hunting alert analysis, further including:

displaying nodes, representing users in a computer network, to the security analyst as potential threats;

receiving a node pinning message, from the security analyst, for a pinned node corresponding to a particular user in a computer network for whom the threat hunting alert was generated; and updating the score for the pinned node representing the particular user to a score that excludes the pinned node from the aggregating by equivalence and hiding.

6. A non-transitory computer-readable medium holding program instructions that, when executed on hardware, cause the hardware to implement clutter reduction actions including:

aggregating by equivalence, and simplifying into an aggregate-node adapted to display at least first and second equivalent chains of nodes, without branches, that have the same length nodes, that have the same edge types connecting the nodes and that are connected at opposing ends to shared first and second endpoint nodes;

excluding from the aggregating at least one third equivalent chain of nodes that are connected to the first and second endpoint nodes, based on an accumulated score across the nodes in the at least one third equivalent chain, wherein the accumulated score exceeds a threat threshold;

causing display, to a security analyst, of at least a portion of a graph with nodes and edges that include the first and second endpoint nodes, the aggregate-node, the at least one third equivalent chain, and edges that connect the nodes, wherein at least one node represents a server entity type;

receiving a node pinning message, from the security analyst, for a pinned node corresponding to a particular server entity as potentially compromised by malware; and updating a score for the pinned node representing the particular server entity to a score value that excludes the pinned node from the aggregating by equivalence.

7. The non-transitory computer-readable medium of claim 6, further including assigning native scores for pending alerts to at least one of the edges between the nodes.

8. The non-transitory computer-readable medium of claim 7, further including distributing the assigned native scores from the edges to nodes connected to the edges.

9. The non-transitory computer-readable medium of claim 6, wherein:

the chains of connected nodes are separated by at least a pair of connected nodes;

an aggregate score ratio, the ratio including the aggregate score of the higher scoring node over the aggregate score of the lower scoring node, exceeds a ratio threshold; and the ratio threshold falls in a range between two and twenty-five.

10. The non-transitory computer-readable medium of claim 6, wherein a security analysis that is a basis of the accumulated score is a threat hunting alert analysis, further including actions of:

displaying nodes, representing users in a computer network, to the security analyst as potential threats;

receiving a node pinning message, from the security analyst, for a pinned node corresponding to a particular user in a computer network for whom the threat hunting alert was generated; and updating the score for the pinned node representing the particular user to a score that excludes the pinned node from the aggregating by equivalence and hiding.

11. A system including a processor and memory coupled to the processor, the memory holding program instructions that, when executed on the processor, cause the processor to implement clutter reduction actions including:

aggregating by equivalence, and simplifying into an aggregate-node adapted to display at least first and second equivalent chains of nodes, without branches, that have the same length nodes, that have the same edge types connecting the nodes and that are connected at opposing ends to shared first and second endpoint nodes;

excluding from the aggregating at least one third equivalent chain of nodes that are connected to the first and second endpoint nodes, based on an accumulated score across the nodes in the at least one third equivalent chain, wherein the accumulated score exceeds a threat threshold;

causing display, to a security analyst, of at least a portion of a graph with nodes and edges that include the first and second endpoint nodes, the aggregate-node, the at least one third equivalent chain, and edges that connect the nodes, wherein at least one node represents a server entity type;

receiving a node pinning message, from the security analyst, for a pinned node corresponding to a particular server entity as potentially compromised by malware; and updating a score for the pinned node representing the particular server entity to a score value that excludes the pinned node from the aggregating by equivalence.

12. The system of claim 11, further including assigning native scores for pending alerts to at least one of the edges between the nodes.

13. The system of claim 12, further including distributing the assigned native scores from the edges to nodes connected to the edges.

14. The system of claim 11, wherein:

the chains of connected nodes are separated by at least a pair of connected nodes;

an aggregate score ratio, the ratio including the aggregate score of the higher scoring node over the aggregate score of the lower scoring node, exceeds a ratio threshold; and the ratio threshold falls in a range between two and twenty-five.

15. The system of claim 11, wherein the security analysis that is a basis of the accumulated score is a threat hunting alert analysis, further including actions of:

displaying nodes, representing users in a computer network, to a security analyst as potential threats;

receiving a node pinning message, from the security analyst, for a pinned node corresponding to a particular user in a computer network for whom the threat hunting alert was generated; and updating the score for the pinned node representing the particular user to a score that excludes the pinned node from the aggregating by equivalence and hiding.

16. The method of claim 1, wherein the graph representing network resources is created from a computer network log over a period of at least one month.

17. The method of claim 1, wherein the graph representing network resources is created from a computer network log over a period of at least one week.

* * * * *